US012740559B2

(12) United States Patent
Hänsel et al.

(10) Patent No.: US 12,740,559 B2
(45) Date of Patent: Sep. 22, 2026

(54) USE OF POLYETHERS AS CARRIER FOR ACTIVE INGREDIENTS

(71) Applicant: Evonik Operations GmbH, Essen (DE)

(72) Inventors: René Hänsel, Dorsten (DE); Katja Skrabania, Essen (DE); Jochen Kleinen, Heinsberg (DE); Frank Schubert, Neukirchen-Vluyn (DE)

(73) Assignee: Evonik Operations GmbH, Essen (DE)

( * ) Notice: Subject to any disclaimer, the term of this patent is extended or adjusted under 35 U.S.C. 154(b) by 559 days.

(21) Appl. No.: 17/997,202

(22) PCT Filed: Apr. 23, 2021

(86) PCT No.: PCT/EP2021/060659
§ 371 (c)(1),
(2) Date: Oct. 26, 2022

(87) PCT Pub. No.: WO2021/219505
PCT Pub. Date: Nov. 4, 2021

(65) Prior Publication Data

US 2023/0200380 A1 Jun. 29, 2023

(30) Foreign Application Priority Data

Apr. 30, 2020 (EP) .................................... 20172266

(51) Int. Cl.
*A01N 25/04* (2006.01)
*A01N 63/38* (2020.01)
*A23K 10/16* (2016.01)

(52) U.S. Cl.
CPC ............ *A01N 25/04* (2013.01); *A01N 63/38* (2020.01); *A23K 10/16* (2016.05)

(58) Field of Classification Search
CPC ......... A01N 25/04; A01N 63/38; A23K 10/16
See application file for complete search history.

(56) References Cited

U.S. PATENT DOCUMENTS 3,793,465 A 2/1974 Bohren
3,839,571 A 10/1974 Ciccone et al.
4,000,258 A 12/1976 Shieh et al.
5,158,922 A 10/1992 Hinney et al.
5,247,114 A 9/1993 Jakobson et al.
5,424,469 A 6/1995 Jakobson et al.
5,466,719 A 11/1995 Jakobson et al.
6,242,499 B1 6/2001 Gruning et al.
7,906,664 B2 3/2011 Allef et al.
8,227,399 B2 7/2012 Wenk et al.
8,598,083 B2 12/2013 Kaminskyj et al.
8,664,175 B2 3/2014 Wenk et al.
8,703,159 B2 4/2014 Wenk et al.
8,993,792 B2 3/2015 Hartung et al.
9,409,853 B2 8/2016 Schuch et al.
9,427,385 B2 8/2016 Meyer et al.
9,738,797 B2 8/2017 Nilewski et al.
9,776,951 B2 10/2017 Friedrich et al.
9,788,551 B2 10/2017 Lüth
10,292,925 B2 5/2019 Gu et al.
10,299,471 B2 5/2019 Hänsel et al.
10,390,530 B2 8/2019 Klostermann et al.
11,234,441 B2 2/2022 Hänsel et al.
2003/0008917 A1 1/2003 Brock et al.
2003/0065027 A1 4/2003 Brock et al.
2003/0119663 A1 6/2003 Ooms et al.
2005/0170053 A1 8/2005 Milani et al.
(Continued)

FOREIGN PATENT DOCUMENTS

CN 106417620 A 2/2017
DE 10 2012 010 012 11/2012
(Continued)

OTHER PUBLICATIONS

"Dowicide G-ST Antimicrobial", Antimicrobial Agents, Section I-11 revised, The DOW Chemical Company, https://www.3.epa.gov/pesticides/chem_search/ppls/001022-00527-19761004.pdf, Oct. 4, 1976, 8 pages.
European Extended Search Report dated Sep. 16, 2020, in European Patent Application No. 20172266.7, 12 pages.
International Search Report dated Jun. 17, 2021, in PCT/EP2021/060659, with English translation, 12 pages.
"Polyalkylene Glycol Monobutyl Ether (PGME)—Handling/Processing", Technical Evaluation Report, Compiled by the USDA AMS Agricultural Analytics Division for the USDA National Organic Program, Jun. 7, 2013, pp. 1-17.
(Continued)

*Primary Examiner* — Sahana S Kaup
*Assistant Examiner* — Toriana N. Vigil
(74) *Attorney, Agent, or Firm* — Grüneberg Global IP, PLLC

(57) ABSTRACT

Compositions containing at least one compound of Formula (I) are useful as carriers for at least one active ingredient.

$$R^1O—[(C_2H_3R^2)—O]_n—H \quad \text{Formula (I).}$$

In Formula (I), $R^1$ is a monovalent aliphatic radical having 1 to 22 carbon atoms; $R^2$ is in each case independently a hydrogen radical or a methyl radical; n is a number from 1 to 300; and at least one $R^2$ radical is a methyl radical. Methods can be used for storing the active ingredient in the carrier and active ingredient compositions contain both the carrier and the active ingredient. The active ingredient compositions can be used for the treatment of plants, seed, and soils; and can be used as a biostimulant, a probiotic food supplement, a probiotic animal feed additive, a plant protection product, or a probiotic medicament. The active ingredient compositions can be used in corresponding methods of treating plants, seed, or soils.

19 Claims, No Drawings

(56) References Cited

U.S. PATENT DOCUMENTS

2006/0165627 A1 7/2006 Allef et al.
2007/0191229 A1 8/2007 Pompeo et al.
2011/0014255 A1 1/2011 Balastre
2011/0028424 A1 2/2011 Zhang et al.
2011/0201533 A1 8/2011 Ponder et al.
2011/0201534 A1 8/2011 Ponder et al.
2011/0201538 A1 8/2011 Wenk et al.
2012/0308503 A1 12/2012 Wenk et al.
2012/0309667 A1 12/2012 Wenk et al.
2012/0309996 A1 12/2012 Wenk et al.
2013/0204021 A1 8/2013 Hartung et al.
2013/0281552 A1 10/2013 Nilewski et al.
2014/0072521 A1 3/2014 Meyer et al.
2014/0212387 A1 7/2014 Lüth
2015/0315123 A1 11/2015 Schuch et al.
2016/0340290 A1 11/2016 Friedrich et al.
2017/0202770 A1 7/2017 Friedrich et al.
2017/0295782 A1 10/2017 Klostermann et al.
2018/0036218 A1 2/2018 Gu et al.
2018/0042235 A1 2/2018 Colon et al.
2018/0125067 A1 5/2018 Hänsel et al.
2019/0037838 A1 2/2019 Klostermann et al.
2019/0059385 A1 2/2019 Hänsel et al.
2021/0145010 A1 5/2021 Hänsel et al.
2021/0315952 A1 * 10/2021 Farmer .................. A61K 45/06
2022/0211036 A1 7/2022 Hänsel et al.
2022/0315799 A1 10/2022 Hänsel et al.

FOREIGN PATENT DOCUMENTS

EP 0 299 295 A2 1/1989
EP 0 636 317 A2 2/1995
EP 2 243 462 A1 10/2010
EP 1 120 457 B1 7/2013
GB 1 593 354 7/1981
WO 93/24013 A2 12/1993
WO 01/80994 A1 11/2001
WO 02/069705 A1 9/2002
WO 2005/107468 A1 11/2005
WO 2011/026983 A1 3/2011
WO 2012/163322 A1 12/2012
WO 2014/122196 8/2014
WO 2015/069708 A1 5/2015
WO 2016/050726 A1 4/2016
WO 2016/055344 A1 4/2016
WO 2017/116837 A1 7/2017
WO 2017/210512 A1 12/2017
WO 2018/078067 A1 5/2018
WO 2019/011825 1/2019
WO WO-2019011825 A1 * 1/2019
WO 2019/162360 8/2019
WO 2019/201777 10/2019
WO 2020/011819 1/2020
WO 2021/083989 5/2021

OTHER PUBLICATIONS

"UCON 50-HB-660 PPG 12-BUTETH-16 Copolymer 55 Gallon Drum", https://www.appliedthermalfluids.com/home/shop/ucon-50-hb-660/, Jan. 1, 2020, 1 page.

Written Opinion dated Jun. 17, 2021, in PCT/EP2021/060659, with English translation, 19 pages.

U.S. Appl. No. 16/072,071, filed Jul. 23, 2018, 2019/0037838, Klostermann et al.

U.S. Appl. No. 17/608,936, filed Nov. 4, 2021, 2022/0315799, Hänsel et al.

U.S. Appl. No. 15/733,753, filed Oct. 16, 2020, Hänsel et al.

U.S. Appl. No. 17/612,105, filed Nov. 17, 2021, Hänsel et al.

European Search Report issued Aug. 21, 2019 in European Application No. 19175286.4, 10 pages.

International Search Report issued Aug. 5, 2020 in PCT/EP2020/063123, with English translation, 7 pages.

Written Opinion issued Aug. 5, 2020 in PCT/EP2020/063123, with English translation, 10 pages.

XP55611940, "Break-Thru SP 133 Product Label", Hopewell, VA, U.S.A., May 9, 2017, pp. 1-2.

XP55611941, "Spray Adjuvants Registered for Use Aquatic Sites in Washington", Washington State Department of Agriculture, Pesticide Management Division, Registration and Licensing Service Program, Olympia, WA, U.S.A., May 15, 2017, pp. 1-5.

Griffin, W., Classification of surface active agents by "HLB", Journal of the Society of Cosmetic Chemists, 1949, 18 pages.

* cited by examiner

USE OF POLYETHERS AS CARRIER FOR ACTIVE INGREDIENTS

CROSS-REFERENCE TO RELATED APPLICATIONS

This application is the National Stage entry under § 371 of International Application No. PCT/EP2021/060659, filed on Apr. 23, 2021, and which claims the benefit of priority to European Application No. 20172266.7, filed on Apr. 30, 2020. The content of each of these applications is hereby incorporated by reference in its entirety.

BACKGROUND OF THE INVENTION

Field of the Invention

The present invention relates to the use of compositions comprising at least one polyether as carrier for an active ingredient: to methods of storing the active ingredient in the carrier; to active ingredient compositions comprising both the carrier and the active ingredient; to the use of these active ingredient compositions for the treatment of plants, for the treatment of seed, for the treatment of soils, as biostimulant, as probiotic food supplement or probiotic animal feed additive: to methods of treating plants, seed or soils using these active ingredient compositions: to these active ingredient compositions for use as probiotic medicament; and to plant protection products, biostimulants, probiotic food supplements, probiotic animal feed additives or probiotic medicaments which contain or consist of this active ingredient composition.

Description of Related Art

In agriculture, microorganisms are used for a multitude of beneficial applications, for example for biological plant protection, for biological plant fortification or for biological soil improvement. In addition, compositions comprising living microorganisms are also used for the treatment of seed. The field of use is thus especially agriculture and forestry including horticulture and pomiculture, and the growing of ornamentals and the growing and care of lawns. In addition, compositions comprising living microorganisms are also employed as probiotics in foods and animal feeds or as probiotic medicaments.

Biological plant protection products—also referred to as biopesticides—are increasingly being used in agriculture since they help to replace or reduce the use of chemical pesticides, and thus reduce residues of chemical pesticides in foods. In the event of resistances of plant pathogens and pests to chemical pesticides, biological plant protection products are alternatives. The use of biological plant protection products is increasingly being promoted by current environmental legislation, since they make use of natural regulation mechanisms that have evolved over the course of evolution, and hence conserve the environment. Biological plant protection products find use, for example, as fungicides, insecticides, nematicides or herbicides and are being used for preventative treatment or curative control of plant pathogens and pests. Active biological ingredients are specified, for example, in *The Manual of Biocontrol Agents,* 2001. The British Crop Protection Council.

According to Article 2 (1) of REGULATION (EC) No 1107/2009 OF THE EUROPEAN PARLIAMENT AND OF THE COUNCIL of 21 Oct. 2009 concerning the placing of plant protection products on the market and repealing Council Directives 79/117/EEC and 91/414/EEC, plant protection products refer to products, in the form in which they are supplied to the user, consisting of or containing active substances, safeners or synergists, and intended for one of the following uses:

a) protecting plants or plant products against all harmful organisms or preventing the action of such organisms, unless the main purpose of these products is considered to be for reasons of hygiene rather than for the protection of plants or plant products;
b) influencing the life processes of plants, such as substances influencing their growth, other than as a nutrient;
c) preserving plant products, in so far as such substances or products are not subject to special Community provisions on preservatives;
d) destroying undesired plants or parts of plants. except algae unless the products are applied on soil or water to protect plants;
e) checking or preventing undesired growth of plants, except algae unless the products are applied on soil or water to protect plants.

The present invention is preferably based on the above-mentioned definition of the term "plant protection products".

According to the provisional definition of the European Biostimulants Industry Council (EBIC), biostimulants contain substance(s) and/or microorganisms whose function when applied to plants or the rhizosphere is to stimulate natural processes to enhance/benefit nutrient uptake, nutrient efficiency, tolerance to abiotic stress, and crop quality (http://www.biostimulants.eu/). For example, the microorganisms *Trichoderma* spp., *Pythium oligandrum. Bacillus* spp., *Pseudomonas* spp. and *Streptomyces* spp. can cause reactions in plants that lead to elevated resistance to pathogens or other stress factors, such as drought, poor nutrient supply, unfavourable pH values and/or high salt content in the soil. The microorganisms *Trichoderma* spp., *Penicillium bilaii, Azotobacter* spp., *Azotomonas* spp., *Azospirillum* spp. and *Rhizobium* spp. can lead, for example, to an improvement in nutrient availability in the soil or directly at the plant roots.

Barriers to broad use of active microbiological ingredients for biological plant protection, for biological plant fortification or for biological soil improvement have to date been their lower efficacy compared to many chemical products. This lower efficacy is based, for example, on inadequate survival capacity of the microorganisms in the formulation during storage. In application, possibly too little active ingredient reaches the target locus on the plant or in the soil, where it may be rapidly degraded by environmental effects. However, these disadvantageous aspects can be improved by a suitable carrier.

The biological plant protection product based on microorganisms as active constituent and the biostimulants are typically diluted in water in the form of a formulation prior to use. These formulations may, for example, be solid formulations, such as wettable powders (WP) or water-dispersible granules (WG), but also liquid formulations such as oil dispersions (OD), suspension concentrates (SC) or dispersion concentrates (DC).

The carrier brings the microorganisms into a form in which they can be handled, such that they can be distributed and applied in water. Since many microorganisms, such as some genera of fungal conidia, are water-repellent, a particular task of the carrier is to make them water-compatible. Moreover, the formulation should also assure the survival capacity of the microorganisms during transport and storage.

The carrier is also to ensure that employment is possible by means of spraying equipment. The aggregation of the microorganisms is thus to be prevented, in order that blockage of nozzles can be ruled out. The carrier is advantageously also to contain those substances that assure the dispersion and distribution of microorganisms in the water, and facilitate the application of the spray liquor to the plants or the soil.

In practice, chemical and biological plant protection products are diluted in water by the user prior to use. For this purpose, the plant protection products are typically added to a tank with water as ingredient and distributed in what is called the spray liquor while stirring. This spray liquor is a ready-to-use dilution of the plant protection products. For cultivation of agricultural areas, these spray liquors are atomized over the plants to be treated. In this connection, atomization means the droplet formation as a result of mechanical action on a liquid medium, preferably by rotation of objects and/or as a result of decompression (reduction in pressure) at small openings. The spray liquor is more preferably applied in the form of a spray generated with the aid of nozzles. For the cultivation of agricultural areas, generally 100 to 1000 litres, optimally 100 to 400 litres, of spray liquor are sprayed per hectare. In exceptional cases, however, departure from these limits is possible. The limits may thus quite possibly vary upward or downward. For example, in what are called low-volume applications, very small volumes down to 1.5 l/ha are sprayed, whereas in the case of application by what is called lance technology very high volumes up to 15 000 l/ha can be achieved. The atomization process here can take place either from high altitudes, for example by means of the spraying of spray liquors from an aeroplane, or from altitudes close to the earth, for example by spraying spray liquors by means of a tractor-mounted sprayer. Other equipment, such as spraying lances, or back-spraying are likewise known for applying spray liquors. The spray liquor is thus typically sprayed by means of a nozzle onto the plants or the soil in a defined dosage. The spray droplets are to be well distributed on the plant or the soil in order that an optimal effect is assured.

For improvement of the biological efficacy (also referred to as effectiveness) of chemical plant protection products, it is standard practice to use what are called adjuvants, also referred to as additives. Adjuvants are typically added to the aqueous spray liquor shortly before deployment and spray application as tankmix additive or integrated directly into plant protection product formulations. The adjuvants are typically added to the spray liquor in concentrations of 0.001% by volume to 1% by volume. The adjuvants reduce the surface tension of water and ensure improved adhesion and wetting of the spray droplets on the hydrophobic leaves of the plant, and hence homogeneous distribution of the plant protection product over a wide area. They also improve the penetration and distribution of the active constituents of the spray liquor into the soil. This increases biological efficacy. Adjuvants can likewise also improve the efficacy of biological plant protection products and, depending on the nature of the formulation, be used as dispersant, emulsifier and wetting agent. However, they may potentially be cytotoxic to living microorganisms and have to date only been used rarely for formulations of living microorganisms. It is particularly advantageous when the adjuvant is not mixed with the active biological ingredient only on production of the spray liquor, but is suitable as a carrier for the active biological ingredient.

The Pesticides Safety Directorate (PSD, the executive branch of the Health and Safety Executive (HSE), a non-governmental public organization in Great Britain) defines an adjuvant as a substance other than water which is not itself pesticidally active but increases the effectiveness of a pesticide (https://www.hse.gov.uk/pesticides/pesticides-registration/applicant-guide/the-applicant-guide-adjuvan.htm). It refers here to REGULATION (EC) No 1107/2009 OF THE EUROPEAN PARLIAMENT AND OF THE COUNCIL of 21 Oct. 2009 concerning the placing of plant protection products on the market and repealing Council Directives 79/117/EEC and 91/414/EEC, Article 2 (3) (d). According to this, substances or preparations which consist of co-formulants or preparations containing one or more co-formulants, in the form in which they are supplied to the user and placed on the market to be mixed by the user with a plant protection product and which enhance its effectiveness or other pesticidal properties, are referred to as "adjuvants". The terms "additives" or "adjuvants" are used synonymously in the present disclosure. Adjuvants used are frequently synthetic surfactants, for example ethoxylated alcohols, nonylphenol ethoxylates, alkyl polyglycosides or polyether-modified trisiloxanes.

The prior art plant protection products typically have multiple disadvantages. It is generally the case for all biological plant protection products that the active biological ingredients present therein, especially microorganisms or spores of microorganisms, lose viability and/or germinability with time. The plant protection products frequently have to be stored at temperatures below 10° C. in order to assure acceptable viability and/or germinability at least for a few weeks. In general, the ability of microorganisms to survive in formulations increases as the storage temperature decreases. For that reason, the user will typically store the formulations in a refrigerator or freezer. The viscosity of liquid formulations at these temperatures is frequently so high that the plant protection products cannot be handled efficiently, and especially cannot be easily dosed. Therefore, the formulations, even at low temperatures, should have a minimum viscosity in order for them to have good processibility, pumpability and miscibility. It is additionally desirable for there to be no precipitation (pour point). The emulsifiability/dispersibility of the liquid plant protection products also improves as the viscosity of the liquid plant protection products approaches the viscosity of the water used for the spray liquor/tankmix. Solid formulations such as WP and WG formulations in turn have the disadvantage that there is the risk of inhalation to the user when measuring-out and mixing the concentrated powder or granules. Moreover, solid formulations that are dispersed in water frequently exhibit reduced wetting of hydrophobic surfaces. Solid formulations additionally have the disadvantage of being poorly distributed in water and of being able to block the nozzles of the spray apparatus. The solid and liquid prior art formulations frequently additionally contain additives that are intended, on the one hand, to improve solubility or dispersibility in water and hence simplify the production of the spray liquor, but on the other hand impair the viability and/or germinability of active biological ingredients.

If plant protection products are based on oils as liquid carriers for the active ingredient, they generally have to be formulated with emulsifiers for the plant protection products to be emulsified/dispersed in water. However, the use of emulsifiers increases the complexity of the plant protection formulations, and it is therefore desirable to use self-emulsifying oils. A further advantage of self-emulsifying oils is that the user can use an adjuvant of their choice as tankmix additive, the action of which does not interfere with the emulsifier from the plant protection formulation but which nevertheless offers the advantages of an oil dispersion.

Furthermore, emulsifiers and surfactants are often toxic to microorganisms, and it is therefore preferable to use self-emulsifying oils. Moreover, surfactants and emulsifiers have a tendency to form superstructures that can have an adverse effect on viscosity. Furthermore, formulations containing surfactants or emulsifiers have a tendency to foam when they are mixed into water or pumped. It is consequently possible to dispense with the use of defoamers when self-emulsifying oil dispersions are used, which offers economic benefits and also benefits for the formulator since, on account of the small number of components, fewer problems also arise with regard to the compatibility of the individual constituents of the plant protection formulation. Furthermore, oil dispersions need not be preserved, and they offer the advantage to the formulator that, unlike in emulsions, little to no effort has to be made to optimize parameters such as droplet size and stabilization. Moreover, only very low hydrolysis, if any, occurs in oil dispersion since the formulation generally contains little or no water. The rheology of oil dispersions can, if required, generally be adjusted by additives, for example silica particles. Moreover, oil dispersions contain no solvents, which minimizes the risk of fire and user contamination and environmental pollution by volatile components/solvents.

WO 2017/210512 A1 discloses a nonaqueous, nonoily liquid carrier for living microorganisms. The carrier is preferably selected from the group consisting of polyethylene glycol, glycerol, ethylene glycol, dipropylene glycol, propylene carbonate and mixtures thereof. A mixture of polyethylene glycol and glycerol is described as being particularly preferred. It is found that the storage stability of biological plant protection products is low when polyethylene glycol or glycerol is used. Moreover, the viscosity of polyethylene glycol and also glycerol is comparatively high at low temperatures as customary for the storage of biological plant protection products, which makes it difficult to dose and handle the plant protection products. Moreover, some polyethylene glycols are solid.

Paul et al. (International Journal of Biological Chemistry (2015), 9 (2), 79-85: DOI: 10.3923/jibc.2015.79.85; "Long Term Preservation of Commercial Important Fungi in Glycerol at 4° C." studied the survival rate of various microorganisms including *Trichoderma* species in glycerol/water mixtures, and found that the survival rate of the organisms is optimal in pure glycerol at 4° C. As already described above, however, the storage stability of biological plant protection products when glycerol is used is nevertheless low, and the viscosity of glycerol is comparatively high at low temperatures as customary for the storage of biological plant protection products, which makes it difficult to dose and handle the plant protection products.

WO 2017/116837 A1 discloses compositions comprising microbial spores, one or more dispersants, one or more protection agents and a nonaqueous liquid carrier. More particularly, polyethylene glycols or polypropylene glycols are disclosed as carrier. The storage stability of biological plant protection products when polyethylene glycols or polypropylene glycols are used is low; polyethylene glycols are additionally either solid or have elevated viscosity at low temperatures, which complicates dosage and handling.

There is therefore still a need to provide carriers for active ingredients that have distinct advantages over the prior art.

SUMMARY OF THE INVENTION

The problem addressed by the present invention was therefore that of providing novel carriers for active ingredients that overcome at least one disadvantage of the prior art.

A particular problem addressed was that of providing carriers for active ingredients that lead to improved storage stability of the active ingredient or plant protection product, which additionally permit a low viscosity and hence better dosability and handling of the plant protection product even at low temperature, and which are additionally self-emulsifiable or water-soluble and hence have good dilutability with water.

It has been found that, surprisingly, this problem is solved by the use of compounds of the formula (I) as carrier for active plant protection ingredients.

The problem addressed by the present invention is therefore solved by the subject-matter as described below. Advantageous configurations of the invention are specified in the examples and the description.

The present invention therefore first provides for the use of a composition comprising at least one compound of the formula (I)

$$R^1O—[(C_2H_3R^2)—O]_n—H \qquad \text{Formula (I)}$$

where $R^1$ is a monovalent aliphatic radical having 1 to 22, preferably 2 to 10, especially 3 to 4, carbon atoms:

$R^2$ is in each case independently a hydrogen radical or a methyl radical, n is a number from 1 to 300, preferably from 5 to 100, especially from 10 to 30, with the proviso that at least one $R^2$ radical is a methyl radical, as carrier for at least one active ingredient.

The present invention further provides a method of storing at least one active ingredient, wherein the at least one active ingredient is stored in a carrier.

The present invention further provides a composition comprising:

(a) at least one compound of the formula (I) and (b) at least one active ingredient.

The present invention further provides for the use of the composition according to the invention i) for the treatment of plants and/or ii) for the treatment of seed and/or iii) for the treatment of soils and/or iv) as biostimulant and/or v) as probiotic food supplement and/or probiotic animal feed additive.

The present invention accordingly also further provides a method of treating plants and/or seed and/or soils using the composition according to the invention.

The present invention still further provides the composition according to the invention for use as probiotic medicament.

The present invention further also correspondingly provides plant protection products, biostimulants, probiotic food supplements, probiotic animal feed additives and probiotic medicaments containing or consisting of the composition according to the invention.

DETAILED DESCRIPTION OF THE INVENTION

The inventive use of a compound of the formula (I) as carrier for an active ingredient leads to improved storage stability of the active ingredient or active ingredient composition. The compound of the formula (I) additionally shows sufficiently low viscosity even at low temperature. This leads to better dosability and simpler handling of the active ingredient composition or the plant protection product. The compound of the formula (I) is additionally self-emulsifiable or water-soluble and hence has good dilutability with water. It is therefore unnecessary to use further additives that improve the solubility or dispersibility of the active ingredient or active ingredient composition in the spray liquor. Correspondingly, the active ingredient composition according to the invention also shows improved storage stability, has better dosability and easier handling and also has good solubility or good dispersibility in water.

The invention is described hereinafter by way of example, without any intention of limiting the invention to these illustrative embodiments. Where ranges, general formulae or compound classes are specified below, these are intended to include not only the corresponding ranges or groups of compounds which are explicitly mentioned but also all subranges and subgroups of compounds which can be obtained by removing individual values (ranges) or compounds. Any embodiment that can be obtained by combination of ranges/subranges and/or groups/subgroups, for example by combinations of inventive, essential, optional, preferred, preferable or preferably selected, further preferred, even further preferred, particularly preferred or especially preferred ranges/subranges and/or groups/subgroups, is fully incorporated into the disclosure content of the present invention and is considered to be explicitly, directly and unambiguously disclosed. Where documents are cited in the context of the present description, the entire content thereof is intended to be part of the disclosure content of the present invention. Where average values are reported hereinafter, these values are numerical averages unless stated otherwise. Where measurements or physical properties are reported hereinafter, unless stated otherwise, these are measurements or physical properties measured at 25° C. and preferably at a pressure of 101 325 Pa (standard pressure). Wherever molecules/molecule fragments have one or more stereocentres or can be differentiated into isomers on account of symmetries or can be differentiated into isomers on account of other effects, for example restricted rotation, all possible isomers are included by the present invention. Specific executions are defined hereinafter, and so features such as indices or structural constituents can be subject to restrictions by virtue of the execution. For all features unaffected by the restriction, the remaining definitions each remain valid. The units $[(C_2H_3R^2)—O]$ in formula (I) may be statistically distributed. Statistical distributions may have a blockwise structure with any number of blocks and any sequence or they may be subject to a randomized distribution; they may also have an alternating structure or else form a gradient along the chain, if there is one: in particular, they can also form any mixed forms in which groups of different distributions may optionally follow one another. The formula (I) describes compounds that may be constructed from repeat units, for example repeating fragments, blocks or monomer units, and may have a molar mass distribution. The frequency of the repeat units is reported by the index n. The index n is the numerical average over all repeat units and should be regarded as a statistical average (number average). The index n and the range of values for the specified index should thus be regarded as the average of the possible statistical distribution of the structures actually present and/or mixtures thereof. Specific embodiments may lead to restrictions of the statistical distributions as a result of the embodiment. For all regions unaffected by such restriction, the statistical distribution is unchanged. Where documents are cited in the context of the present description, the entire content thereof is intended to be part of the disclosure content of the present invention.

According to the invention, a composition comprising at least one compound of the formula (I)

$$R^1O—[(C_2H_3R^2)—O]_n—H \quad \text{Formula (I)}$$

where $R^1$ is a monovalent aliphatic radical having 1 to 22, preferably 2 to 10, especially 3 to 4, carbon atoms, $R^2$ is in each case independently a hydrogen radical or a methyl radical, n is a number from 1 to 300, preferably from 5 to 100, especially from 10 to 30, with the proviso that at least one $R^2$ radical is a methyl radical, is used as carrier for at least one active ingredient.

The composition comprising at least one compound of the formula (I) which is to be used as carrier is also referred to simply as carrier or carrier composition in the context of this disclosure. A composition comprising the carrier and the active ingredient is also referred to in the context of this disclosure as active ingredient composition.

The carrier composition is preferably liquid. It enables the dissolving or dispersing of the active ingredient, especially of fungi and fungal spores. The active ingredient is thus dissolved or dispersed in the carrier. The carrier additionally assists the dissolving or dispersing of the active ingredient in an aqueous composition, for example the spray liquor.

The compound of the formula (I) has a terminal monovalent aliphatic radical $R^1$ having 1 to 22, preferably 2 to 10, especially 3 to 4, carbon atoms. By comparison with polyethers that are exclusively OH-terminated, this leads to a distinct improvement in storage stability. $R^1$ may, for example, be linear or branched, cyclic or acyclic, and saturated or unsaturated. It is preferable that the $R^1$ radical is an alkyl radical, preferably a radical selected from the group consisting of methyl, ethyl, n-propyl, iso-propyl, n-butyl, iso-butyl, sec-butyl, tert-butyl, n-pentyl (amyl), 2-pentyl (sec-pentyl), 3-pentyl: 2-methylbutyl, 3-methylbutyl (iso-pentyl or iso-amyl), 3-methylbut-2-yl, 2-methylbut-2-yl, 2,2-dimethylpropyl (neopentyl), hexyl, octyl, decyl, dodecyl, myristyl, stearyl, 2-ethylhexyl, 2-propylheptyl, 3,5,5-trimethylhexyl, isononyl, isotridecyl, especially an n-butyl radical.

The compound of the formula (I) has one or more divalent $—[(C_2H_3R^2)—O]—$ groups where each $R^1$ radical is independently a hydrogen radical or a methyl radical. The divalent $—[(C_2H_3R^2)—O]—$ groups are thus alkyleneoxy groups. If $R^2$ is a hydrogen radical, i.e. in the case that: $R^2$=H, the $—[(C_2H_3R^2)—O]—$ group is a $—[(C_2H_4)—O]—$ group, i.e. a $—(CH_2CH_2—O)—$ group, i.e. an ethyleneoxy group. If, by contrast, $R^1$ is a methyl radical, i.e. in the case that: $R^2$=$CH_3$, the $—[(C_2H_3R^2)—O]—$ group is a $—[(C_2H_3(CH_3))—O]—$ group. i.e. a propyleneoxy group. Each propyleneoxy group may independently be in the spatial orientations $—(CH_2—CH(CH_3)—O)—$ or $—(CH(CH_3)—CH_2—O)—$, but preferably in the spatial orientation $—(CH_2—CH(CH_3)—O)—$, in the compound of the formula (I), where the compound of the formula (I) should be based on the spatial orientation chosen in formula (I), i.e. a spatial orientation in which the $R^1O$ group is present bonded at the left-hand end and the OH group at the right-hand end of the compound of the formula (I).

The index n is a number from 1 to 300, preferably from 5 to 100, especially from 10 to 30. The index n is thus, for example, a number from 1 to 300, from 2 to 250, from 3 to 200, from 4 to 150, from 5 to 100, from 6 to 81, from 7 to 50, from 8 to 40 and/or from 10 to 30, preference being given in each case to a narrower numerical range over a broader numerical range. When n>300, the viscosity of the compound of the formula (I) is significantly increased and it is therefore not very suitable as carrier since the elevated viscosity worsens the dosability and handling of the active ingredient composition.

It is preferably the case for the compound of the formula (I) that 10% to 100%, preferably 20% to 80%, especially 40% to 60%, of the $R^2$ radicals are methyl radicals, the maximum value being 100%. The proportion of propyleneoxy groups based on the total amount of alkyleneoxy groups, i.e. the total amount of propyleneoxy and ethyleneoxy groups together, is thus from 10% to 100%, preferably from 20% to 80%, especially from 40% to 60%, the maximum value being 100%. The number of propyleneoxy groups divided by the total number of alkyleneoxy groups, i.e. the total number of propyleneoxy and ethyleneoxy groups together, is thus from 10% to 100%, preferably from 20% to 80%, especially from 40% to 60%, the maximum value being 100%.

This is because it has been found that polyethers containing solely ethyleneoxy units and no propyleneoxy units show a high viscosity or are solid, especially at low temperatures, whereas polyethers having solely propyleneoxy units and no ethyleneoxy units or else containing both ethyleneoxy units and propyleneoxy units have a low viscosity across the board.

The following embodiments have been found to be particularly advantageous:

In a preferred embodiment of the invention, a compound of the formula (I)

$$R^1O—[(C_2H_3R^2)—O]_n—H \qquad \text{Formula (I)}$$

where $R^1$ is a monovalent aliphatic radical having 2 to 10 carbon atoms, especially an alkyl radical having 2 to 10 carbon atoms;

$R^2$ is in each case independently a hydrogen radical or a methyl radical;

n is a number from 2 to 250;

with the proviso that 20% to 80% of the $R^2$ radicals are methyl radicals, is used.

In a further-preferred embodiment of the invention, a compound of the formula (I)

$$R^1O—[(C_2H_3R^2)—O]_n—H \qquad \text{Formula (I)}$$

where $R^1$ is a monovalent aliphatic radical having 2 to 10 carbon atoms, especially an alkyl radical having 2 to 10 carbon atoms;

$R^2$ is in each case independently a hydrogen radical or a methyl radical;

n is a number from 5 to 100;

with the proviso that 20% to 80% of the $R^2$ radicals are methyl radicals, is used.

In a still further-preferred embodiment of the invention, a compound of the formula (I)

$$R^1O—[(C_2H_3R^2)—O]_n—H \qquad \text{Formula (I)}$$

where $R^1$ is a monovalent aliphatic radical having 3 to 4 carbon atoms, especially an alkyl radical having 3 to 4 carbon atoms;

$R^2$ is in each case independently a hydrogen radical or a methyl radical;

n is a number from 6 to 81;

with the proviso that 20% to 80% of the $R^2$ radicals are methyl radicals, is used.

In a still further-preferred embodiment of the invention, a compound of the formula (I)

$$R^1O—[(C_2H_3R^2)—O]_n—H \qquad \text{Formula (I)}$$

where $R^1$ is a monovalent aliphatic radical having 3 to 4 carbon atoms, especially an alkyl radical having 3 to 4 carbon atoms;

$R^2$ is in each case independently a hydrogen radical or a methyl radical;

n is a number from 8 to 40;

with the proviso that 20% to 80% of the $R^2$ radicals are methyl radicals, is used.

In a still further-preferred embodiment of the invention, a compound of the formula (I)

$$R^1O—[(C_2H_3R^2)—O]_n—H \qquad \text{Formula (I)}$$

where $R^1$ is a monovalent aliphatic radical having 3 to 4 carbon atoms, especially an alkyl radical having 3 to 4 carbon atoms;

$R^2$ is in each case independently a hydrogen radical or a methyl radical;

n is a number from 10 to 30;

with the proviso that 20% to 80% of the $R^2$ radicals are methyl radicals, is used.

In a likewise-preferred embodiment of the invention, a compound of the formula (I)

$$R^1O—[(C_2H_3R^2)—O]_n—H \qquad \text{Formula (I)}$$

where $R^1$ is an n-butyl;

$R^2$ is in each case independently a hydrogen radical or a methyl radical;

n is a number from 2 to 250;

with the proviso that 20% to 80% of the $R^2$ radicals are methyl radicals, is used.

In a further-preferred embodiment of the invention, a compound of the formula (I)

$$R^1O—[(C_2H_3R^2)—O]_n—H \qquad \text{Formula (I)}$$

where $R^1$ is an n-butyl;

$R^2$ is in each case independently a hydrogen radical or a methyl radical;

n is a number from 5 to 100;

with the proviso that 20% to 80% of the $R^2$ radicals are methyl radicals, is used.

In a still further-preferred embodiment of the invention, a compound of the formula (I)

$$R^1O—[(C_2H_3R^2)—O]_n—H \qquad \text{Formula (I)}$$

where $R^1$ is an n-butyl;

$R^2$ is in each case independently a hydrogen radical or a methyl radical;

n is a number from 6 to 81;

with the proviso that 20% to 80% of the $R^2$ radicals are methyl radicals, is used.

In a still further-preferred embodiment of the invention, a compound of the formula (I)

$$R^1O—[(C_2H_3R^2)—O]_n—H \qquad \text{Formula (I)}$$

where $R^1$ is an n-butyl;

$R^2$ is in each case independently a hydrogen radical or a methyl radical;

n is a number from 8 to 40;

with the proviso that 20% to 80% of the $R^2$ radicals are methyl radicals, is used.

In a still further-preferred embodiment of the invention, a compound of the formula (I)

$R^1O—[(C_2H_3R^2)—O]_n—H$ Formula (I)

where $R^1$ is an n-butyl;

$R^2$ is in each case independently a hydrogen radical or a methyl radical;

n is a number from 10 to 30;

with the proviso that 20% to 80% of the $R^2$ radicals are methyl radicals, is used.

In a likewise-preferred embodiment of the invention, a compound of the formula (I)

$R^1O—[(C_2H_3R^2)—O]_n—H$ Formula (I)

where $R^1$ is an n-butyl;

$R^2$ is in each case independently a hydrogen radical or a methyl radical;

n is a number from 2 to 250;

with the proviso that 40% to 60% of the $R^2$ radicals are methyl radicals, is used.

In a further-preferred embodiment of the invention, a compound of the formula (I)

$R^1O—[(C_2H_3R^2)—O]_n—H$ Formula (I)

where $R^1$ is an n-butyl;

$R^2$ is in each case independently a hydrogen radical or a methyl radical;

n is a number from 5 to 100;

with the proviso that 40% to 60% of the $R^2$ radicals are methyl radicals, is used.

In a still further-preferred embodiment of the invention, a compound of the formula (I)

$R^1O—[(C_2H_3R^2)—O]_n—H$ Formula (I)

where $R^1$ is an n-butyl;

$R^2$ is in each case independently a hydrogen radical or a methyl radical;

n is a number from 6 to 81;

with the proviso that 40% to 60% of the $R^2$ radicals are methyl radicals, is used.

In a still further-preferred embodiment of the invention, a compound of the formula (I)

$R^1O—[(C_2H_3R^2)—O]_n—H$ Formula (I)

where $R^1$ is an n-butyl;

$R^2$ is in each case independently a hydrogen radical or a methyl radical;

n is a number from 8 to 40;

with the proviso that 40% to 60% of the $R^2$ radicals are methyl radicals, is used.

In a still further-preferred embodiment of the invention, a compound of the formula (I)

$R^1O—[(C_2H_3R^2)—O]_n—H$ Formula (I)

where $R^1$ is an n-butyl;

$R^2$ is in each case independently a hydrogen radical or a methyl radical;

n is a number from 10 to 30;

with the proviso that 40% to 60% of the $R^2$ radicals are methyl radicals, is used.

Carrier compositions containing or consisting (essentially) of compounds of the formula (I) according to at least one of these three embodiments are notable for a particularly good profile of properties. They lead to improved storage stability of the active ingredient, have low viscosity even at low temperature and hence enable better dosability and handling of the active ingredient composition, and are additionally self-emulsifiable or water-soluble and hence have good dilutability with water.

It is further preferable that the number-average molar mass of the at least one compound of the formula (I) is at least 300 g/mol, more preferably at least 400 g/mol, preferably at least 800 g/mol, especially at least 1200 g/mol, where the number-average molar mass is preferably determined as described in the examples. It is further preferable that the number-average molar mass of the at least one compound of the formula (I) is from 300 g/mol to 4500 g/mol, more preferably from 400 g/mol to 3000 g/mol, preferably from 800 g/mol to 2000 g/mol, especially from 1200 g/mol to 1500 g/mol, where the number-average molar mass is preferably determined as described in the examples. A number-average molar mass within the above-specified ranges leads to an optimal viscosity at low temperatures (e.g. 0° C.) at which biological plant protection products in particular are frequently stored, and also at room temperature (e.g. 25° C.), at which chemical plant protection products in particular are stored. If the viscosity is too high, the active ingredient composition is difficult to dose and handle; if the viscosity is too low, there can be unwanted separation of dispersion phase and dispersed phase, for example settling/sinking of the active ingredient.

The polarity, molecular weight and hydrophobicity/hydrophilicity of compounds of the formula (I) can be adjusted such that they are self-emulsifying in water or water-soluble and hence have good dilutability with water. It is preferable that the HLB value of the at least one compound of the formula (I) is from 0.0 to 14.0, preferably from 3.0 to 10.0, especially from 7.0 to 9.5. "HLB" stands for hydrophilic-lipophilic balance. The HLB value can be determined by various prior art methods and is a recognized measure of hydrophobicity/hydrophilicity. The HLB value is preferably determined by the Griffin method (W. C. Griffin: *Classification of surface active agents by HLB. J. Soc. Cosmet. Chem.* 1, 1949, p. 311-326). The HLB value is calculated here by the formula $$HLB = 20 \cdot \left(1 - \frac{m_1}{m}\right)$$

where $m_l$ is the molar mass of the lipophilic component of a molecule and m is the molar mass of the entire molecule. The molar mass $m_h$ of the hydrophilic component of a molecule is correspondingly found using $m_h = m - m_l$. The molar masses are determined by prior art methods; they are preferably determined by mass spectrometry; the lipophilic component or the hydrophilic component is likewise preferably determined from the mass spectrometry results using the stoichiometric principles known to the person skilled in the art. The molar masses can also be calculated from the molecular structure. In the case of compounds of the formula (I), mass of the hydrophilic component is calculated from the total mass of all-$[(C_2H_3R^2)—O]$— groups with $R^2$=H, i.e. from the total mass of all ethyleneoxy groups (oxyethylene groups) present.

It has also been found that, surprisingly, the viscosity and dilutability (self-emulsifiability or water solubility) of the carrier can be controlled by mixing of different polyethers.

It is therefore preferable that at least one compound (A) and at least one different compound (B) are used, where both the at least one compound (A) and the at least one compound (B) are compounds of the formula (I), and where the HLB value of the at least one compound (A) is from 0.0 to 10.0, preferably from 0.0 to 3.0, especially from 0.0 to 3.0, and the HLB value of the at least one compound (B) is from 2.0 to 15.0, preferably from 4.0 to 14.0, especially from 8.0 to 13.0.

The combination of a compound (A) with HLB=0 that has solely oxypropylene units and no oxyethylene units and a compound (B) with HLB>0 that has both oxyethylene units and oxypropylene units shows particularly advantageous properties as carrier.

It is preferable that the carrier contains predominantly the at least one compound of the formula (I). It is therefore preferable that the proportion by mass of the at least one compound of the formula (I) is at least 90%, preferably at least 95%, especially at least 99%, based on the total mass of the carrier, the maximum value being 100%. It is thus preferable that the proportion by mass of all compounds of the formula (I) is at least 90%, preferably at least 95%, especially at least 99%, based on the total mass of the carrier, the maximum value being 100%

It is particularly advantageous when the composition used as carrier consists (essentially) of the at least one compound of the formula (I). i.e. when the proportion by mass of the at least one compound of the formula (I) is 100%, i.e. corresponds to the maximum value. It is thus preferable that the proportion by mass of all compounds of the formula (I) is 100%, i.e. corresponds to the maximum value.

Processes for preparing compounds of the formula (I) are known to the person skilled in the art. The compounds of the formula (I) are preferably obtained by reacting hydroxy-functional compounds of the formula $R^1$—OH where $R^1$ is as defined in formula (I) with propylene oxide (PO) and optionally additionally ethylene oxide (EO). This reaction is an alkoxylation reaction of $R^1$—OH with PO and optionally additionally EO. The hydroxy-functional compounds of the formula $R^1$—OH used are aliphatic monofunctional alcohols having 1 to 22, preferably 2 to 10, especially 3 to 4, carbon atoms. The hydroxy-functional compound of the formula $R^1$—OH constitutes the starter (the starter compound) for the alkoxylation reaction with the alkylene oxide(s), i.e. PO and optionally additionally EO. The alkylene oxides add onto the starter. The alkylene oxides are added onto the OH group in a polyaddition reaction with ring opening and preferably in the presence of a suitable catalyst. This leads to formation of the inventive compounds of the formula (I). The alkylene oxides may be added either individually in pure form, in alternating succession in any metering sequence, or else simultaneously in mixed form. This determines the sequence of the oxyalkylene units or alkyleneoxy units as repeat units in the polyether chain that forms. By the process, it is possible to construct polyether chains having the feature of controlled and reproducible preparability in terms of structure and molar mass. The sequence of repeat units can be varied by the sequence of addition of the alkylene oxides within broad limits. The molar mass of the compound of the formula (I) may be varied within wide limits and controlled in a controlled and reproducible manner via the molar ratio or mass ratio of the alkylene oxides in relation to the starter $R^1$—OH. The composition of compounds of the formula (I) can thus be adjusted via the stoichiometry. For example, the reaction product of 296 g (4 mol) of n-butanol. 870 g (15 mol) of propylene oxide and 660 g (15 mol) of ethylene oxide is a compound of the formula $R^1O—[(C_2H_3R^2)—O]_n—H$ with n=7.5 and $R^1$=n-butyl, where 50% of the $R^2$ radicals are methyl radicals. The HLB value of this compound is 7.2. The correlations between metered addition and product structure are known to those skilled in the art.

For the alkoxylation reaction, i.e. the reaction of the compound $R^1$—OH with PO and optionally additionally EO, it is possible in principle to use any of the alkoxylation catalysts known to the person skilled in the art, for example basic catalysts such as alkali metal hydroxides such as NaOH and KOH, alkali metal alkoxides such as sodium methoxide and potassium methoxide, amines, guanidines, amidines, phosphorus compounds such as triphenylphosphine, and additionally acidic and Lewis-acidic catalysts such as $SnCl_4$, $SnCl_2$, $SnF_2$, $BF_3$ and $BF_3$ complexes, and double metal cyanide (DMC) catalysts, especially those containing zinc hexacyanocobaltate (III). The DMC catalysts used are preferably the DMC catalysts described in U.S. Pat. No. 5,158,922, US20030119663, WO 01/80994. The catalysts may be amorphous or crystalline.

After the alkoxylation reaction has ended, there preferably follows a period of further reaction for completion of the conversion. The further reaction can be conducted, for example, by continued reaction under reaction conditions (i.e. maintenance, for example, of the temperature and the pressure) without addition of reactants. Preferably, the further reaction is effected with mixing of the reaction mixture, especially with stirring.

Unreacted alkylene oxides and any further volatile constituents can be removed after the alkoxylation reaction, for example, by vacuum distillation, steam or gas stripping, or other methods of deodorization.

The reaction product is preferably neutralized with an acid such as lactic acid, acetic acid, propionic acid or phosphoric acid, and the salts formed are optionally removed by filtration.

Reactor types used for the alkoxylation reaction may in principle be any suitable reactor types that allow control over the reaction and its exothermicity. The reaction regime may be continuous, semicontinuous or else batchwise in a manner known from chemical engineering, and can be matched flexibly to the production equipment available. As well as conventional stirred tank reactors, it is also possible to use jet loop reactors with a gas phase and internal heat exchanger tubes as described in WO 01/062826. In addition, it is possible to use gas phase-free loop reactors.

The average molar mass (number-average molar mass Mn or mass-average molar mass Mw) and polydispersity Mw/Mn of the compounds of formula (I) is adjustable within wide limits via the molar ratio of the alkylene oxides to the starter $R^1$—OH used. It is preferable that the number-average molar mass of the at least one compound of the formula (I) is from 300 g/mol to 4500 g/mol, more preferably from 400 g/mol to 3000 g/mol, preferably from 800 g/mol to 2000 g/mol, especially from 1200 g/mol to 1500 g/mol, where the number-average molar mass is preferably determined as described in the examples. It is further preferable that the polydispersity Mw/Mn is from 1.0 to 3.0, preferably from 1.02 to 2.0, especially from 1.03 to 1.6, where the polydispersity is preferably determined as described in the examples. The compounds of formula (I) are liquid, pasty or solid according to the composition and molar mass.

The carrier may contain further constituents that differ from the at least one compound of the formula (I). For example, the carrier may contain defoamers, for example selected from the group of the water-insoluble hydrophobic compounds. Defoamers used may, for example, be silicone oils, organomodified siloxanes, mineral oils, vegetable oils and modified vegetable oils. In addition, further constituents present may be solids that affect the rheological properties, for example silica. Further constituents may be antioxidants. Biocides may additionally be present, provided that they do not impair the active ingredient. Further constituents present may additionally be water-absorbing substances, in order to even further improve storage and, later on in the application, dilutability with water if appropriate, to facilitate handling, to provide additional humectant properties and/or to prevent crystallization of active substances. Further constituents may be dispersion additives having what are called anchor groups for solids, for example sulfonates, phosphates, aromatic groups, hydroxyl groups. The dispersing additives should preferably not be surfactants. For the reasons discussed above, surfactants should preferably not be present in the carrier as further constituents other than the at least one compound of the formula (I). What are meant by surfactants in the context of the present disclosure are interface-active substances which, when mixed with water in a concentration of 0.5% by weight at a temperature of 20° C. and left to stand under those conditions for one hour, a) give a transparent or translucent liquid or a stable emulsion without separation of insoluble substances and
b) lower the surface tension of water to $4.5\times10^{-2}$ N/m (45 dyn/cm) or less.

This corresponds to the definition of interface-active substances according to Customs Tariff Number Position 3402 (European Union). Surface tension can be ascertained, for example, with a tensiometer, which ascertains surface tension via the shape of a pendant drop (pendant drop method, drop contour analysis). An example of a suitable tensiometer is model OCA 25 (DataPhysics).

It is preferable that the at least one active ingredient is selected from the group consisting of active chemical ingredients and active biological ingredients, preferably selected from the group consisting of active chemical and microbiological ingredients, especially selected from the group of the active microbiological ingredients.

It is further preferable that the at least one active ingredient is selected from the group of the active biological ingredients, especially of the active microbiological ingredients.

It is further preferable that at least one active ingredient is selected from the group of the active biological ingredients, especially of the active microbiological ingredients.

It can thus be preferable that the at least one active ingredient is exclusively selected from the group of the active biological ingredients, especially of the active microbiological ingredients. In this case it is also preferable that the at least one active ingredient is not selected from the group of the active chemical ingredients.

Alternatively, it can be preferable that at least one active ingredient is selected from the group of the active biological ingredients, especially of the active microbiological ingredients, and optionally additionally at least one active ingredient is selected from the group of the active chemical ingredients.

It is further preferable that the active ingredient has a preferably antagonistic and/or hyperparasitic effect directed against a particular pathogen, preferably plant pathogen.

The active ingredient is preferably an active plant protection ingredient which is effective in useful plants for healing or alleviation of or prevention of disorders or pest infestation, or acts as a biostimulant.

It is preferable that the at least one active ingredient is selected from the group consisting of acaricides (AC), bactericides (BA), fungicides (FU), herbicides (HE), insecticides (IN), nematicides (NE), growth regulators (PG), plant fortifiers (PS), biostimulants, inoculates and mixtures thereof; preferably from the group consisting of fungicides (FU), herbicides (HE), insecticides (IN), biostimulants and mixtures thereof; especially from the group consisting of fungicides (FU), herbicides (HE), insecticides (IN) and mixtures thereof. Some of these active ingredients are specified, for example, in *The Manual of Biocontrol Agents*. 2001. The British Crop Protection Council and in *The Pesticide Manual'* 14th edition, 2006. The British Crop Protection Council. However, the present invention is not limited solely to these active ingredients listed therein.

It is further preferable that at least one active ingredient from the group of the fertilizers is additionally present, preferably selected from the group consisting of NPK fertilizers and micronutrients, where the micronutrients more preferably contain the elements K. Mg. Mn, Zn and/or Fe.

Particular preference is given to the combination of at least one active ingredient selected from the group consisting of fertilizers and biostimulants with at least one further active ingredient selected from the group consisting of fungicides (FU), herbicides (HE) and insecticides (IN).

The active ingredient preferably increases resistance and/or stress tolerance and/or nutrient availability in plants.

It is preferable that the active (biological or microbiological) ingredient is selected from the group consisting of microorganisms, organs of microorganisms and mixtures thereof. It is especially preferable that the microorganism is living and/or active.

The microorganisms in the context of the present disclosure include bacteria, fungi, algae, protozoa and viruses.

The microorganisms may accordingly be selected from the group consisting of bacteria, fungi, algae, protozoa, viruses and mixtures thereof.

The microorganism is preferably selected from the group consisting of fungi and bacteria.

The microorganism is preferably not selected from the group of viruses, especially not from the group consisting of viruses, algae and protozoa.

The active (biological or microbiological) ingredient is preferably selected from the group consisting of fungi, fungal organs, bacteria, bacterial organs and mixtures thereof.

The active (biological or microbiological) ingredient is preferably selected from the group consisting of fungi, fungal organs and mixtures thereof.

It is further preferable that the fungal organs are selected from the group consisting of spores, conidia, blastospores, chlamydospores, sclerotia, hyphal segments and mixtures thereof.

Further preferably, the active (biological or microbiological) ingredient is selected from the group consisting of the fungi *Ampelomyces quisqualis, Aureobasidium pullulans, Beauveria bassiana, Beauveria brongniartii, Candida oleophila, Clonostachys rosea, Coniothyrium minitans, Gliocladium catenulatum, Gliocladium virens, Isaria fumosorosea, Isaria* spp., *Laetisaria arvalis, Lecanicillium lecanii, Lecanicillium muscarium, Metarhizium anisopliae, Myrothecium verrrucaria, Metarhizium riley* (*Nomuraea rileyi*), *Paecilomyces lilacinus, Phlebiopsis gigantea, Phoma*

*macrostoma, Purpureocillium lilacinus, Pythium oligandrum, Talaromyces flavus, Teratospema oligociadum, Trichoderma asperellum, Trichoderma atroviride, Trichoderma gamsil, Trichoderma hamatum, Trichoderma harzianum, Trichoderma koningii, Trichoderma reesei, Trichoderma* spp., *Verticillium biguttatum*, their fungal organs, and mixtures of these fungi and/or fungal organs.

More preferably, the active (biological or microbiological) ingredient is selected from the group consisting of the fungi *Ampelomyces quisqualis, Aureobasidium pullulans, Beauveria bassiana, Candida oleophila, Clonostachys rosea, Coniothyrium minitans, Gliocladium virens, Isaria fumosorosea, Lecanicillium muscarium, Metarhizium anisopliae, Myrothecium verrrucaria, Metarhizium rileyi* (*Nomuraea rileyi*), *Purpureocillium lilacinus, Phlebiopsis gigantea, Trichoderma asperellum, Trichoderma atroviride, Trichoderma gamsii, Trichoderma hamatum, Trichoderma harzianum, Trichoderma koningii. Trichoderma reesei*, their fungal organs, and mixtures of these fungi and/or fungal organs.

Particular preference is given to the use of the following fungi having antagonistic and/or hyperparasitic action against particular plant pathogens: *Ampelomyces quisqualis, Beauveria bassiana, Beauveria brongniartii, Clonostachys rosea, Coniothyrium minitans, Gliocladium catenulatum, Isaria* spp., *Laetisaria arvalis, Lecanicillium lecanii, Lecanicillium muscarium, Metarhizium anisopliae, Metarhizium rileyi* (*Nomuraea rileyi*), *Paecilomyces lilacinus, Phoma macrostoma, Pythium oligandrum, Talaromyces flavus, Teratosperma oligociadum, Trichoderma* spp. and *Verticillium biguttatum.*

Fungi used with preference that improve nutrient availability in the soil or increase the resistance of the plants to stress factors (including pathogens and pests) are: *Penicillium bilaii, Trichoderma* spp. and all species that can be classified in the group of the Mycorrhiza fungi.

Active (microbiological) ingredients selected from the group consisting of fungi, fungal organs and mixtures thereof are particularly suitable for use as plant protection product or active plant protection ingredient, for use as biostimulant and/or for treatment of seed.

It is preferable that the active (biological or microbiological) ingredient is a bacterium or a mixture of various bacteria.

It is further preferable that the bacterium or the mixture of various bacteria is selected from the group consisting of *Azospirillum brasilense, Azotobacter chroococcum, Bacillus amyloliquefaciens, Bacillus firmus, Bacillus licheniformis, Bacillus mycoides, Bacillus pumilus, Bacillus subtilis, Bacillus thuringiensis, Bradyrhizobium* spp., *Burkholderia* spp., *Chromobacterium subtsugae, Gluconacetobacter* spp., *Pseudomonas chlororaphis, Pseudomonas fluorescens, Pseudomonas syringae, Rhizobium* spp., *Streptomyces griseoviridis, Streptomyces lydicus* and mixtures thereof. These compositions are particularly suitable for use as plant protection products, for use as biostimulant and/or for treatment of seed.

It is further preferable that the bacterium or the mixture of various bacteria is selected from the group consisting of *Lactobacillus gasseri, Lactobacillus paracasei, Lactobacillus plantarum, Lactobacillus crispatus, Lactobacillus casei, Lactobacillus animalis, Lactobacillus rhamnosus, Lactobacillus pentosus, Lactobacillus reuteri, Lactococcus lactis, Bacillus pumilus, Bacillus licheniformis, Bacillus coagulans, Bacillus cereus, Bacillus subtilis, Bacillus amyloliquefaciens, Clostridium butyricum, Enterococcus faecium, Streptococcus faecium, Lactobacillus acidophilus, Lactobacillus salivarius, Lactobacillus fermentum, Lactobacillus johnsonii, Lactobacillus helveticus, Streptococcus thermophiles, Pediococcus acidilactici, Bifidobacterium lactis, Bifidobacterium adolescentis, Bifidobacterium lactobacillus, Bifidobacterium animalis, Bifidobacterium longum, Bifidobacterium infantis* and mixtures thereof. These compositions are particularly suitable for use as probiotic in foods and/or animal feeds.

It is further preferable that the active (biological or microbiological) ingredient is selected from the group consisting of lactobacilli, bifidobacteria, *Enterococcus faecalis, Enterococcus faecium* and the yeast fungi *Saccharomyces boulardii* and *Saccharomyces cerevisiae* and mixtures thereof. These compositions may be suitable, for example, for use as probiotic medicament. For some disorders and fields of use, the efficacy of probiotic medicaments is comparatively well-researched. These include various chronic inflammatory bowel disorders, various diarrhoeal disorders, chronic constipation, prevention of allergies and infections in premature babies, prevention of neurodermatitis, infections of the throat, nose, ears, urinary tract infections and dental caries.

It is likewise preferable that the active (biological or microbiological) ingredient is a virus or a mixture of different viruses, preferably selected from the group of the baculoviruses, further preferably from the nucleopolyhedrovirus and granulovirus genera. In a preferred embodiment of the composition, the active microbiological ingredient selected is the CpGV virus (*Cydia pomonella* granulovirus). This virus is used, for example, for protection from codling moth caterpillars in pomiculture. In a further preferred embodiment of the composition, the active microbiological ingredient selected is the HearNPV virus (*Helicoverpa armigera* nucleopolyhedrovirus). This virus acts specifically against the larvae of the cotton bollworm and is used, for example, for protection of cotton plants.

It is further preferable that the active (biological or microbiological) ingredient is a mixture of the abovementioned microorganisms and/or organs thereof.

It is especially preferable that the at least one active (biological or microbiological) ingredient is selected from the group consisting of *Trichoderma harzianum, Bacillus amyloliquefaciens, Beauveria bassiana, Metarhizium rileyi* (*Nomuraea rileyi*), *Metarhizium anisopliae, Clonostachys rosea, Aureobasidium pullulans, Coniothyrium minitans* and organs thereof, where the organs are preferably selected from the group consisting of spores, conidia, blastospores, chlamydospores, sclerotia and hyphal segments.

It is further preferable that the at least one active (biological or microbiological) ingredient comprises or consists of spores, preferably fungal spores and/or bacterial spores, especially spores of *Trichoderma harzianum* and/or of *Bacillus amyloliquefaciens* and/or of *Beauveria bassiana* and/or of *Metarhizium rileyi* (*Nomuraea rileyi*) and/or of *Metarhizium anisopliae* and/or of *Clonostachys rosea* and/or of *Aureobasidium pullulans* and/or of *Coniothyrium minitans.*

It is even more preferable that the at least one active (biological or microbiological) ingredient is selected from the group consisting of *Trichoderma harzianum* and spores of *Trichoderma harzianum.*

It is even more preferable that the at least one active (biological or microbiological) ingredient comprises or consists of spores of *Trichoderma harzianum.*

It is especially preferable that the at least one active (biological or microbiological) ingredient is spores of *Trichoderma harzianum.*

It is also preferable that the active microbiological ingredient comprises vegetative cells, especially vegetative cells of *Pseudomonas fluorescens* and/or *Pseudomonas chlororaphis*.

The adjustment of the activity of water increases the viability and/or germinability of the active microbial ingredient present and hence also the storability (shelf life) thereof. The activity of water ($a_w$) is a thermodynamic parameter. It is a measure of the amount of water available for chemical, biochemical and microbial reactions in samples, for example aqueous solutions and food/drink compositions, and can also be used to characterize the carrier compositions and the active ingredient composition. Activity of water is reported as the $a_w$ value and is defined as the ratio of the water vapour pressure above the sample (p) to the water vapour pressure of pure water ($p_0$) at the same temperature, $a_w=p/p_0$. The activity of water corresponds to 1/100 of the relative equilibrium humidity (REH). Relative equilibrium humidity is also referred to as equilibrium relative humidity (ERH). Pure water has an $a_w$ of 1, and any addition of water-binding substances results in lowering of the $a_w$ below 1. It is preferable that the $a_w$ of the carrier composition is less than 0.4, preferably less than 0.3, especially less than 0.25. Water or aqueous solutions are generally unsuitable for use as carrier for active microbiological ingredients owing to their high water activity. Methods of determining the $a_w$ value are known to the person skilled in the art. The $a_w$ value is preferably determined as described below:

To determine the activity of water of a sample, the air humidity is measured directly above a sample after attainment of equilibrium relative humidity (partial water vapour pressure differential). Equilibrium relative humidity (ERH) is measured in % relative humidity and is related to the $a_w$ value by the following relationship: $a_w$=ERH/100. The activity of water in the compositions was determined using the LabMaster-aW neo from Novasina.

The compounds of the formula (I) may optionally contain small amounts of water (for example as a result of the synthesis or absorption of air humidity in the course of storage). It may therefore be advantageous to adjust, especially to reduce, the water content and hence the activity of water. This can be accomplished, for example, by means of a thermal separation process. Thermal separation processes are known by this term to those skilled in the art and include all processes based on the establishment of a thermodynamic phase equilibrium. Preferred thermal separation processes are selected from the group consisting of distillation, rectification, adsorption, crystallization, extraction, absorption, drying and freezing-out, particular preference being given to methods of distillation and rectification. For drying, it is also possible to use desiccants such as molecular sieves, for example zeolites.

It is preferable that the at least one active ingredient is a combination of at least one active biological ingredient and at least one active chemical ingredient, preferably a combination of at least one active microbiological ingredient and at least one active chemical ingredient.

Preferred active chemical ingredients or active ingredient classes are strobilurins, carboxamides, triazoles, benzophenones, morpholines, neonicotinoids, sulfonylureas, growth promoters, total herbicides and combinations thereof.

It is further preferable that the chemical active ingredient is selected from the group consisting of azoxystrobin, pyraclostrobin, isopyrazam, epoxyconazole, difenoconazole, metrafenon, fenpropimorph, thiamethoxam, rimsulfuron, dicamba, glyphosate and combinations thereof.

The inventive use of the carrier composition preferably leads to an improvement in handling and dosability of the active ingredient composition since the carrier composition at 25° C. preferably has a viscosity of less than 1 Pa·s, and at 0° C. preferably has a viscosity of less than 10 Pa·s.

It is therefore preferable that the carrier composition at 25° C. has a viscosity of less than 1 Pa·s, and at 0° C. has a viscosity of less than 10 Pa·s. The viscosity is preferably determined as described in the examples.

The inventive use of the carrier composition preferably leads to an increase in storage stability of the active (biological or microbiological) ingredient. Preferably, the storage stability is determined as described in the examples.

It is therefore further preferable that the proportion of germinable spores or vegetative cells after storage at 40° C. after 28 days is at least 1%, further preferably at least 2%, especially at least 3%, based on the starting value. Preferably, the proportion of germinable spores or vegetative cells is determined as described in the examples.

The present invention therefore also further provides a method of storing at least one active ingredient, wherein the at least one active ingredient is stored in a carrier.

The invention further provides a composition (also referred to in the present disclosure as active ingredient composition) comprising:

(a) at least one compound of the formula (I) and (b) at least one active ingredient.

The above remarks are applicable to the carrier (the carrier composition), the at least one compound of the formula (I) and the at least one active ingredient. All definitions, embodiments and elucidations that are applicable to the inventive use are thus also applicable mutatis mutandis to the composition (active ingredient composition) according to the invention and to the method according to the invention and to further subject-matter of the present invention, and vice versa.

It is preferable that the active ingredient composition consists (essentially) of components (a) and (b).

It is further preferable that the proportion by mass of the carrier, based on the total mass of the active ingredient composition, is from 40% to <100%, preferably from 70% to <99.999%, especially from 80% to 99.99%.

It is further preferable that the proportion by mass of the at least one active ingredient (i.e. of all active ingredients together), based on the total mass of the active ingredient composition, is from >0% to 60%, preferably from 0.001% to 30%, especially from 0.01% to 20%.

It is therefore preferable that the proportion by mass of the carrier based on the total mass of the active ingredient composition is from 40% to <100%, preferably from 70% to <99.999%, especially from 80% to 99.99%, and that the proportion by mass of the at least one active ingredient (i.e. of all active ingredients together), based on the total mass of the active ingredient composition, is >0% to 60%, preferably from 0.001% to 30%, especially from 0.01% to 20%.

It is therefore preferable that the proportion by mass of all compounds of the formula (I) based on the total mass of the active ingredient composition is from 40% to <100%, preferably from 70% to <99.999%, especially from 80% to 99.99%, and/or the proportion by mass of all active ingredients based on the total mass of the active ingredient composition is from >0% to 60%, preferably from 0.001% to 30%, especially from 0.01% to 20%.

Preferably, the $a_w$ value of the active ingredient composition is less than 0.4, preferably less than 0.3, especially less than 0.25. The $a_w$ value is preferably determined here as for the carrier.

It is further preferable that the active ingredient composition is in liquid form, i.e. for example, in the form of an oil dispersion (OD), dispersion concentrate (DC) or suspension concentrate (SC). This has the advantage that the composition is easy to handle. But it is also possible that the active ingredient composition is solid, i.e., for example, is in the form of a wettable powder (WP) or of water-dispersible granules (WG). But it is especially preferable that the active ingredient composition is in the form of an oil dispersion (OD).

The active ingredient composition is obtainable by mixing the active ingredient with the carrier. It is preferable that the active ingredient is dissolved and/or suspended and/or dispersed in the carrier.

When an active microbiological ingredient is used, the active ingredient is preferably cultivated here beforehand on a nutrient medium suitable for the purpose by methods known per se, for example submerged fermentation or solid fermentation. Preferably, the cultivated microorganism is processed by suitable separation, drying, grinding and/or dispersion methods. Preferably, after the cultivation, the microorganism and/or its organs that are used with preference are preferably separated from the culture substrate. In a particularly preferred variant, the culture substrate over which the microorganism has grown (especially in the case of use of solid culture substrates) is dried beforehand. In another variant, the microorganism or its organs used with preference, after they have been separated from the culture substrate, can be dried, for example, with the aid of freeze-drying or spray-drying methods. After the separation and any drying, the microorganism and/or its organs are suspended and/or dispersed in the carrier It is further preferable that the microorganism, preferably selected from the group of the fungi, is processed by grinding and/or dispersing methods. In this case, the cultivation is followed, prior to the separation of the microorganism and/or its organs that are used with preference, by processing of the culture substrate on which they have grown by a suitable dispersion method or, after drying, by a suitable grinding method. Preferably, there is then a subsequent separation/isolation of the microorganism or of its organs that are used with preference by methods known per se, such as sieving, filtration, windsifting, decanting and/or centrifugation methods. Preferably, the active ingredient composition is produced by mixing the at least one microorganism and/or its organs into the carrier, preferably in a mixing tank using a stirrer. This preferably affords a liquid active ingredient composition, for example an oil dispersion (OD), suspension concentrate (SC) or dispersion concentrate (DC). By selection of suitable compounds of the formula (I) and/or use of appropriate viscosity regulators, it is possible to adjust the viscosity such that at least only a reduced separation, if any, of the microorganisms that have been mixed into the liquid formulation, preferably an OD, SC or DC formulation, can be observed.

The active ingredient composition is preferably diluted with water in the spray tank to give a spray liquor for application to plants or on or in the soil. The proportion by mass of the water based on the total mass of the spray liquor is preferably 80% to 99.99%, preferably 90% to 99.9%, especially 95% to 99%. Alternatively, the proportion by mass may be higher or lower, according to the application rate of the at least one active ingredient. The spray liquor should preferably be sprayed at a maximum of 1000 litres, preferably 50 litres to 600 litres, especially at 100 litres to 400 litres, of water per hectare, which is guided by the application rate of the at least one active ingredient and by the type and number of plants.

The present invention further provides for the use of the active ingredient composition according to the invention for the treatment of plants and/or of seed and/or of soils, and/or for use as biostimulant.

The present invention further accordingly also provides a method of treating plants and/or seed and/or soils with the active ingredient composition according to the invention and/or using the active ingredient composition according to the invention Preferably, the active ingredient composition according to the invention is used as plant protection product, plant fortification product or soil improvement product: more preferably, the active ingredient composition according to the invention is used for plant protection. It is thus preferable that the active ingredient composition according to the invention is a plant protection product.

More preferably, the active ingredient composition according to the invention, if the at least one active ingredient is selected from the group of the active biological ingredients, especially the active microbiological ingredients, is used as biological plant protection product, biological plant fortification product or biological soil improvement product; more preferably, this active ingredient composition of the invention is used for biological plant protection.

In the case of use for plant protection, for the treatment of seed and/or as a biostimulant, the active ingredient composition is preferably mixed or watered into the soil or applied to the plant or to the seed. According to the intended end use, the active ingredient composition here is optionally diluted with water to the use concentration.

Preferably, the active ingredient compositions according to the invention are used as formulation, preferably as plant protection formulation, for spray liquors. Preferably, the proportion by mass here of the carrier based on the total mass of the spray liquor is from 0.001% to 1%, further preferably from 0.01% to 0.5%.

Preferably, the spray liquor is applied to the plant via an irrigation system selected from the group consisting of micro-irrigation systems, sprinkler systems and drip systems.

For their use on plants or plant parts, plant protection formulations are, in most cases, diluted with water before the usual spraying through nozzles, and may contain, as well as the active component, other auxiliaries too, such as emulsifiers, dispersing aids, antifreeze agents, defoamers, biocides and surface-active substances such as surfactants. Emulsifiers or surface-active substances such as surfactants, if they are not compounds of the formula (I), are preferably absent. Active substances, especially fungicides, insecticides and nutrients, alone or in combination and having been provided with the other auxiliaries specified above, can also be applied by various methods to seeds (seed) of plants. Such methods are also referred to as seed treatment methods. The treatment of seed with fungicides and insecticides can protect plants in the early stage of growth from diseases and attack by insects.

The plant protection formulations can also be applied to the plants by means of insects that pollinate plants, called "pollinators", for example bumblebees or bees. The composition here is optionally diluted with water to the use concentration. But preference is given to using the composition undiluted. The spreading of chemical plant protection products by means of pollinating insects is described, for example, in WO 2011026983 A1. Biological plant protection products can also be spread in a corresponding manner. It is advantageous here when the pollinators are not impaired or damaged by the active ingredient or the composition.

If biocides are employed in the formulations, they are selected such that they are not harmful to any microorganisms present in the composition according to the invention. This means that the microorganisms in the formulation are restricted only to a minor degree, if at all, in their viability and/or germinability.

An active ingredient composition containing conidia of *Paecilomyces lilacinus* as active microbiological ingredient can be used for the biological control of phytoparasitic nematodes. When spores of *Talaromyces flavus* are used, the preparation can be used for control of *Verticillium dahliae*, a pathogen that causes economically relevant wilting in cotton. Compositions containing spores of *Metarhizium rileyi* (*Nomuraea rileyi*) can be used to control the caterpillars of various damaging butterfly species, for example *Helicoverpa armigera* and *Spodoptera exigua*. The employment of the composition using conidia of *Penicillium bilaii* increases the availability of mineral phosphorus in the soil.

Preferred agricultural fields of use of the active ingredient compositions are arable farming, growing of garden and ornamental plants, viticulture and cotton growing. Particular preference is given to fruit and vegetable growing. Preferred fruit is pome fruit, stone fruit, berry fruit and shelled fruit. Preferred vegetables are root vegetables, shoot vegetables, tuber vegetables, onion-type vegetables, leafstalk vegetables, leaf vegetables, leaf lettuces, seed vegetables and fruit vegetables.

In the case of use of the active ingredient composition i) for the treatment of plants and/or ii) for the treatment of seed and/or iii) for the treatment of soils and/or iv) as biostimulant the active ingredient composition is preferably used as a formulation for spray liquors, where the proportion by mass of the carrier composition based on the total mass of the spray liquor is 0.001% to 1%.

The present invention further provides for the use of the active ingredient composition as probiotic food supplement and/or probiotic animal feed additive. The active ingredient compositions may be used as probiotic in foods and/or animal feeds. Probiotic foods and/or animal feeds typically contain bacteria and/or fungi as active microbial ingredient. The probiotic foods include, for example, yoghurt preparations, kefir preparations, soured milk preparations and vegetables fermented in soured milk. The active microbial ingredient here displays a health-promoting effect in the intestine.

The use of the active ingredient composition as a probiotic food supplement and/or probiotic animal feed additive is with the proviso that the at least one active ingredient present therein is suitable for use as a probiotic food supplement and/or probiotic animal feed additive.

The present invention further provides an active ingredient composition according to the invention for use as probiotic medicament.

The active ingredient composition for use as a probiotic medicament is subject to the proviso that the at least one active ingredient present therein is suitable for use as a probiotic medicament.

In accordance with the inventive use of the active ingredient composition, the present invention also further provides plant protection products, biostimulants, probiotic food supplements, probiotic animal feed additives and probiotic medicaments containing or consisting of the active ingredient composition according to the invention.

All definitions, embodiments and elucidations that are applicable to the inventive use or to the composition (active ingredient composition) according to the invention are thus also applicable mutatis mutandis to the plant protection products, biostimulants, probiotic food supplements, probiotic animal feed additives and probiotic medicaments according to the invention.

The carrier compositions and active ingredient compositions have numerous advantages:

One advantage is the improvement in the storability of microorganisms through use of the carrier composition or improved storability of the active ingredient composition. More particularly, the active ingredient composition can be stored at room temperature for many weeks. This simplifies transport and storage. The composition is stored and transported, preferably with exclusion of air, in bottles, pouches, canisters or drums that have been sealed airtight. The elevated storability especially leads to an increase in biological activity.

Furthermore, the active ingredient composition, especially in the form of a dispersion concentrate, suspension concentrate or oil dispersion, shows improved viability and/or germinability compared to the prior art.

A further improvement over the prior art is that the microorganisms and/or their organs remain viable and/or germinable for much longer in the ready-to-use aqueous dilutions than in the aqueous dilutions based on the prior art.

Prior to application, formulations of fungal spores can be made up, for example, in a preliminary mixture with water in order to accelerate germination and reduce infection time (cf. H. D. Burges: *Formulation of Microbial Biopesticides*, Springer. 1998). Some manufacturers of microbial products (e.g. Remedier® from Isagro, Naturalis® from CBC Europe, FZB24 from ABiTEP GmbH) likewise recommend activating the spores in the formulation prior to spray application. For this purpose, the formulation is diluted in a relatively small amount of water in a vessel (by a factor of 3 to 50) and left to stand for 2 to 24 hours prior to spraying. Since the microorganisms are particularly sensitive in this phase, it is advisable to use a carrier composition which is biocompatible in the formulation without any adverse effects on the microorganism. The active ingredient composition according to the invention features a higher lifetime of microorganisms present at room temperature or slightly elevated temperatures. Thus, it is uncomplicated to store and to transport, and does not require any cooling in order to ensure that a sufficiently high concentration of germinable or viable microorganisms reaches the target locus on the plant or in the soil. In the ready-to-use aqueous dilutions, the carrier compositions or active ingredient compositions according to the invention do not impair the germination or growth of microorganisms at the target locus.

A further advantage is that the carrier facilitates the dispersion of the active ingredient in an aqueous composition, for example the spray liquor.

A further advantage is that the carrier is self-emulsifying or water-soluble or can be rendered self-emulsifying or water-soluble. The carrier thus has good dilutability or can be rendered dilutable with water. The carrier composition and the active ingredient composition can be readily dispersed or even dissolved in water. Dilutability, i.e. self-emulsifiability or water solubility, is preferably determined as described in the examples. Self-emulsifying or water-soluble and hence dilutable carriers or active ingredient compositions can be dispersed or dissolved in water without any great input of shear. Self-emulsifying carriers here spontaneously form emulsion droplets, preferably with an average size of less than 400 μm, further preferably less than 200 μm, especially less than 100 μm. The size of the emulsion droplets can be determined, for example, by laser diffraction, for example by using laser diffraction systems or by computer-assisted image evaluation of high-resolution static images of the spray mist. The size of the emulsion droplets is preferably measured by laser diffraction, more preferably by using the MasterSizer 3000 from Malvern. The carrier can thus be efficiently dissolved or dispersed in water and forms a clear solution or a milky emulsion in water when the carrier and water are mixed in a mass ratio of 100:100 to 0.0001:100. Since efficiency enhancers for plant protection products are generally water-soluble in order thus to improve the efficacy of plant protection products from aqueous spray liquors, it is surprising in the light of the prior art that similar effects can also be achieved with self-emulsifying compositions. The self-emulsifying effect can especially be achieved by controlled adjustment of the hydrophobicity/hydrophilicity of the compound of the formula (I). In the case of tankmix formulations, there is sufficiently homogeneous distribution of the compound of the formula (I) in the spray liquor, for example even during the tankmixing operation. This facilitates firstly the preparation of spray liquors. Furthermore, it does not result in blockage of the spray nozzles as a result of the good incorporability and the associated homogeneous distribution during the spraying operation.

A further advantage is that the compound of the formula (I) has sufficiently low viscosity even at low temperature. This leads to better dosability and simpler handling of the plant protection product.

A further advantage is the biodegradability of many compounds of the formula (I), of the carrier and of the composition comprising the carrier and the active (biological or microbiological) ingredient. Biodegradability is preferably determined here by the OECD 301 F method. Further preferably, biodegradability is determined in accordance with OECD 301 F after 28 days at 22° C.

A further advantage is that the adhesion and retention of sprays/spray liquors containing the carrier composition or the active ingredient composition on plant surfaces that are difficult to wet is also improved.

A further advantage is the excellent compatibility of compounds of the formula (I) with conventional adjuvants and defoamers. Suitable adjuvants and defoamers are known to the person skilled in the art and are commercially available, for example, under the BREAK-THRU® (Evonik Industries AG), SURFYNOL® (Evonik Industries AG) and TOMADOL® (Evonik Industries AG) trade names. Particularly good compatibility is found with BREAK-THRU® S 301 and BREAK-THRU® S 255.

Yet a further advantage is that the viscosity, rheology and/or sedimentation characteristics of the dissolved active ingredient can be adjusted in a simple manner by addition of silica. Suitable silicas are known to the person skilled in the art and are commercially available, for example, under the AEROSIL® (Evonik Industries AG) trade name.

The examples that follow describe the present invention by way of example, without any intention that the invention, the scope of application of which is apparent from the entirety of the description, be restricted to the embodiments specified in the examples.

EXAMPLES

Test Methods

Polydispersity, Mass-Average Molar Mass (Mw) and Number-Average Molar Mass (Mn):

For determination of polydispersity, mass-average molar mass (Mw) and number-average molar mass (Mn), GPC analyses were conducted under the following analysis conditions: SDV 1000/10 000 Å column combination (length 65 cm), temperature 30° C., THE as mobile phase, flow rate 1 ml/min, sample concentration 10 g/l, RI detector, evaluation against polypropylene glycol standard.

Acid Number:

Acid number determination was performed by a titration method in accordance with DIN EN ISO 2114.

Hydroxyl Number (OH Number):

Hydroxyl numbers were determined by method DGF C-V 17 a (53) of the Deutsche Gesellschaft für Fettwissenschaft [German Society for Fat Science]. This involved acetylating the samples with acetic anhydride in the presence of pyridine and determining the consumption of acetic anhydride by titration with 0.5 N potassium hydroxide solution in ethanol against phenolphthalein.

Viscosity:

The viscosity of the liquid to be tested (carrier without spores) was determined with the aid of an MCR 302 rheometer, Anton Paar. The measurement geometry used was a plate of diameter 50 mm. Measurement was effected at a shear rate of 10 $s^{-1}$. The measurement temperature was controlled by a Peltier element to 25° C. or 0° C.

Production of the Compositions with *Trichoderma harzianum* as Active Ingredient and a Carrier, and Determination of Storage Stability:

The active ingredient used was spores of the fungus *Trichoderma harzianum*, which were sourced in powder form from Rhizo-Mic UG. According to elemental analysis, apart from the spores, the powder contained about 75% by weight of $SiO_2$. The content of germinable spores was $1.97\times10^9$ spores/g of powder. The compositions containing the carrier and the spores of *Trichoderma harzianum* were produced as follows: 3 g or 6 g of the powder containing spores was weighed into a 50 ml centrifuge tube (sterile 50 ml tubes from Greiner Bio-One GmbH) and blanketed with 27 g or 24 g of carrier, so as to obtain 30 g of the composition containing the carrier and the spores of *Trichoderma harzianum* in each case. The mixture was mixed on a vortex shaker (lab dancer from ika) for 30 seconds. After homogenization with a spatula, the compositions, after a wait time of 15 minutes, were mixed again on a vortex shaker for 30 seconds. The compositions thus produced were incubated at 40° C. for four weeks. The number of colony-forming units (CFU) was determined immediately after production (starting value) and after 4 weeks. The number of colony-forming units (CFU) is a measure of the number of spores that were able, before or after storage, to germinate and form colonies. To determine the number of colony-forming units (CFU), by the plating method, 1.0 g of the sample material was diluted with sterile physiological saline (0.9% by weight of NaCl in water) in a decimal dilution series down to the level of $10^{-8}$. The three dilution levels of $10^{-6}$, $10^{-7}$ and $10^{-8}$ (1.0 ml of each) were plated onto ready-made nutrient medium (Compact Dry YM for yeasts and mould fungi or Compact Dry Total Count from Nissui Pharmaceutical Co., Ltd.). The fungal spores were incubated at 25° C. for three days. Those plates on which 10 to 100 CFU were visible were evaluated. Table 3 shows the percentage of colony-forming units (in CFU/g) based on the starting value, as a measure of the survival rate or of the storage stability of the composition. The results shown are arithmetic averages from a triple determination.

Dilutability (Self-Emulsifiability/Water Solubility):

A 400 ml beaker was filled with 200 ml of tap water. 1 ml of the liquid to be tested (carrier without spores) was drawn up in a 2.5 ml plastic pipette and pipetted into the water from about ten centimetres above the water level by pushing hard on the pipette. After about 10 seconds, the beaker is picked up and three clockwise swirling motions are conducted by hand in order to test the further distribution. After the swirling, the mixture should be homogeneously white (milky) or clear. The mixture thus produced is left to stand for 60 minutes and assessed again after that time for homogeneity (creaming/greasy spots). If the mixture is still homogeneously white, the mixture is self-emulsifiable; if the mixture is still clear, it is water-soluble. The assessment was conducted by three experienced laboratory workers. Dilutability (self-emulsifiability/water solubility) was tested at 20° C. to 22° C.

Carriers Used:

Commercially Available Raw Materials:

Commercially available raw materials selected were Examples 1 to 8 as potential carriers (see Table 1). Examples 2 to 8 are linear, OH-terminated polyethers.

TABLE 1 commercially available raw materials as carriers (PEG: poly(ethylene glycol), PPG: poly(propylene glycol), EO: ethylene oxide or ethyleneoxy, PO: propylene oxide or propyleneoxy)

| Example | Raw material | Manufacturer | Molar mass in g/mol | Mass ratio EO/PO |
|---|---|---|---|---|
| 1[1] | Glycerol (ultrapure, min. 98%, anhydrous) | Bernd Kraft GmbH | 92 | — |
| 2[1] | PEG 400 (Kollisolv ® PEG E 400) | Sigma Aldrich | 320-420 | 100/0 |
| 3[1] | PEG 1000 | Sigma-Aldrich | 950-1050 | 100/0 |
| 4[1] | PEG 2000 (BioUltra) | Sigma-Aldrich | 1900-2200 | 100/0 |
| 5[1] | PO/EO copolymer (Pluronic ® PE 6400) | BASF | 2920 | 40/60 |
| 6[1] | PO/EO copolymer (PPG 2290) | Evonik | 2200 | 10/90 |
| 7[1] | PPG 400 (Lupranol ® 1200) | BASF | 400 | 0/100 |
| 8[1] | PPG 2000 (Voranol ® P 2000 L) | Dow Chemical | 2000 | 0/100 |

[1]not according to the invention

Synthesis Examples

In addition, the following polyethers were prepared as potential carriers (Examples 9 to 18): Synthesis of Examples 9 to 14 and 16 to 18:

A 3 litre autoclave was initially charged with allyl alcohol or n-butanol as starter alcohol and sodium methoxide or potassium methoxide as base under nitrogen, and this initial charge was heated to 80-90° C. while stirring. The reactor was evacuated down to an internal pressure of 400 mbar in order to remove any volatile ingredients present by distillation. Propylene oxide (PO) and/or ethylene oxide (EO) were metered in continuously while cooling and stirring at 110-120° C. and maximum internal reactor pressure 4.0 bar (absolute) for 6 h. Continued reaction at 110-120° C. for 60 minutes was followed by degassing. Volatile components such as residual propylene oxide or ethylene oxide were distilled off under reduced pressure. The polyether was neutralized with phosphoric acid. Water was removed by distillation at <30 mbar and 100° C. under reduced pressure. The low-viscosity and colourless polyether was cooled down to below 80° C. and discharged through a filter. The amounts of starter alcohol, sodium methoxide, ethylene oxide (EO) and/or propylene oxide (PO) used and the characterization of the polyethers obtained can be found in Table 2.

Synthesis of Example 15

A 3 litre autoclave was initially charged with 80.0 g of butanol and 11.3 g of sodium methoxide as base under nitrogen, and this initial charge was heated to 80-90° C. while stirring. The reactor was evacuated down to an internal pressure of 400 mbar in order to remove any volatile ingredients present by distillation. 2210 g of propylene oxide was metered in continuously while cooling and stirring at 115° C. and maximum internal reactor pressure 4.0 bar (absolute) for 11 h. Continued reaction at 110-120° C. for 60 minutes was followed by degassing. Volatile components such as residual propylene oxide were distilled off under reduced pressure. The polyether was neutralized with phosphoric acid. Water was removed by distillation at <30 mbar and 100° C. under reduced pressure. The low-viscosity and colourless polyether was cooled down to below 80° C. and discharged through a filter. The product had an OH number of 32.2 mg KOH/g. According to GPC analysis, the product has a mass-average molar mass Mw of 1835 g/mol and a polydispersity Mw/Mn of 1.10 (see also Table 2).

TABLE 2

Production and characterization of the polyethers of Examples 9 to 18 (EO: ehylene oxide or ethyleneoxy, PO: propylene oxide or propyleneoxy):

| Example | Starter alcohol | Base | m(EO) in g | m(PO) in g | m(EO)/ m(PO) | Proportion of $R^2$ radicals with $R^2$ = $CH_3$ in % [3] | Index n [4] | HLB [5] | OH number in mg KOH/g | Mw in g/mol | Mw/ Mn |
|---|---|---|---|---|---|---|---|---|---|---|---|
| 9[1] | 200 g n-butanol | 6.0 g sodium methoxide | 2350 | 0 | 100/0 | 0 | 20 | 18.4 | 61.6 | 910 | 1.05 |
| 10[2] | 200 g n-butanol | 8.7 g sodium methoxide | 1679 | 719 | 70/30 | 25 | 19 | 12.9 | 61.3 | 914 | 1.08 |
| 11[2] | 111 g n-butanol | 6.0 g sodium methoxide | 883 | 640 | 58/42 | 35 | 21 | 10.8 | 55.8 | 1035 | 1.07 |
| 12[2] | 90 g n-butanol | 7.2 g sodium methoxide | 748 | 1033 | 42/58 | 51 | 29 | 8.0 | 40.3 | 1386 | 1.06 |
| 13[2] | 200 g n-butanol | 5.5 g sodium methoxide | 0 | 936 | 0/100 | 100 | 6 | 0.0 | 137 | 410 | 1.06 |
| 14[2] | 200 g n-butanol | 6.5 g sodium methoxide | 0 | 1840 | 0/100 | 100 | 12 | 0.0 | 79.5 | 705 | 1.07 |

TABLE 2-continued

Production and characterization of the polyethers of Examples 9 to 18
(EO: ehylene oxide or ethyleneoxy, PO: propylene oxide or propyleneoxy):

| Example | Starter alcohol | Base | m(EO) in g | m(PO) in g | m(EO)/m(PO) | Proportion of $R^2$ radicals with $R^2 = CH_3$ in % [3] | Index n [4] | HLB [5] | OH number in mg KOH/g | Mw in g/mol | Mw/Mn |
|---|---|---|---|---|---|---|---|---|---|---|---|
| 15[2] | 80 g n-butanol | 11.3 g sodium methoxide | 0 | 2210 | 0/100 | 100 | 35 | 0.0 | 32.2 | 1835 | 1.10 |
| 16[2] | 145 g allyl alcohol | 6.8 g sodium methoxide | 1665 | 586 | 74/26 | 21 | 19 | 13.9 | 60.2 | 932 | 1.07 |
| 17[2] | 100 g allyl alcohol | 7.8 g sodium methoxide | 1026 | 1416 | 42/58 | 51 | 28 | 8.1 | 39.4 | 1420 | 1.06 |
| 18[2] | 58 g allyl alcohol | 10.5 g potassium methoxide | 1742 | 2405 | 42/58 | 51 | 81 | 8.3 | 14.4 | 4140 | 1.22 |

[1]not according to the invention

[2]according to the invention

[3] proportion of $R^2$ radicals with $R^2 = CH_3$ in the compound of formula (I) reported in % = molar proportion of PO based on the total amount of PO and EO = n(PO)/(n(PO) + n(EO)), with n(PO) = m(PO)/M(PO) and n(EO) = m(EO)/M(EO) and M(PO) = 59.08 g/mol and M(EO) = 44.05 g/mol

[4] index n according to formula (I) = average chain length = average number of repeat units

[5] calculated by $HLB = 20 \cdot (1-m_l/m) = 20 \cdot ((m-m_l)/m) = 20\, m_h/m = 20 \cdot m(EO)/[m(starter\ alcohol) + m(EO) + m(PO)]$ Performance Testing:

Examples 1 to 18 were tested for their suitability as carrier. This involved testing the viscosity of the carrier as a measure of handling/dosability/pourability, the proportion of germinable spores after storage as a measure of the storage stability of a composition composed of carrier and active ingredient, and dilutability (self-emulsifiability or water solubility) of the carrier. A low viscosity leads to good pourability and easy dosability. A high proportion of germinable spores demonstrates high storage stability. High self-emulsifiability or water solubility, i.e. good dilutability, facilitates the production of the spray liquor. The results for Examples 1 to 18 are collated in Table 3.

TABLE 3

Results of the performance testing of Examples 1 to 18

| Example | Viscosity at 25° C. in Pa · s | Viscosity at 0° C. in Pa · s | Proportion of germinable spores after storage at 40° C. [6] | Dilutability |
|---|---|---|---|---|
| 1[1] | 0.862 | 21.148 | 0.017 [7] | distributability relatively poor owing to viscosity, clear after stirring |
| 2[1] | 0.089 | 450 | 0.222 [8] | water-soluble in a clear solution |
| 3[1] | solid | solid | — | — |
| 4[1] | solid | solid | — | — |
| 5[1] | 0.556 | 367 | 0.135 [7] | moderately good distributability, clear after stirring |
| 6[1] | 0.359 | 1.958 | 0.052 [8] | moderately good distributability, clear after stirring (cloudy above 23° C.) |
| 7[1] | 0.073 | 0.441 | 0.073 [8] | water-soluble in a clear solution |
| 8[1] | 0.332 | 11.875 | 0.084 [8] | moderately good distributability, clear after stirring |
| 9[2] | solid | solid | — | |
| 10[2] | 0.084 | 0.466 | 7.6 [7]/7.7 [8] | water-soluble in a clear solution |
| 11[2] | 0.105 | 0.617 | 5.6 [7]/3.4 [8] | water-soluble in a clear solution |
| 12[2] | 0.179 | 1.154 | 4.4 [7]/6.5 [7]/4.8 [8] | water-soluble in a clear solution |
| 13[2] | 0.016 | 0.055 | 6.1 [8] | good distributability, stable milky emulsion |
| 14[2] | 0.040 | 0.156 | 7.2 [7] | good distributability, stable milky emulsion |
| 15[2] | 0.201 | 1.46 | 5.3 [7] | moderately good distributability, stable milky emulsion with few greasy spots |

TABLE 3-continued

Results of the performance testing of Examples 1 to 18

| Example | Viscosity at 25° C. in Pa · s | Viscosity at 0° C. in Pa · s | Proportion of germinable spores after storage at 40° C. [6] | Dilutability |
|---|---|---|---|---|
| 16[2] | 0.081 | 0.445 | 5.6 [8] | water-soluble in a clear solution |
| 17[2] | 0.173 | 1.038 | 13.3 [7] | water-soluble in a clear solution |
| 18[2] | 1.096 | 5.138 | 5.3 [7] | distributability poor owing to increased viscosity, clear after stirring |
| spores without carrier | — | — | 0.052 | — |

[1]not according to the invention
[2]according to the invention
[6] expressed as the percentage of colony-forming units of *Trichoderma harzianum* (in CFU/g) based on the starting value
[7] experiments were conducted with 90% by weight of carrier and 10% by weight of spore powder
[8] experiments were conducted with 80% by weight of carrier and 20% by weight of spore powder Inventive examples 10 to 18, by comparison with non-inventive examples 1 to 9, show a viscosity of less than 1 Pa·s at 25° C. and of less than 10 Pa·s at 0° C. (each measured as pure substance without spores) and, when used as carrier for spores of *Trichoderma harzianum*, lead to a percentage of colony-forming units (in CFU/g) based on the starting value, in the case of storage at 40° C., to values exceeding 3%. The inventive carriers 10 to 18 have good handling/dosability/pourability both at 25° C. and at 0° C., and lead to an improvement in storage stability at least by a factor of 10 compared to the non-inventive carriers. Storage stability is greatly reduced in the case of the di-OH-terminated polyethers (see Examples 2 to 8) compared to the mono-OH-terminated polyethers (see Examples 10 to 12, 14 to 18). Polyethers containing solely oxyethylene units (=ethyleneoxy units) and no oxypropylene units (=propyleneoxy units), especially at low temperatures, show high viscosity or are even solid (see Examples 2 to 4 and 9), whereas polyethers having solely oxypropylene units and no oxyethylene units or containing both oxyethylene units and oxypropylene units show low viscosity across the board. Dilutability with water is sufficient across the board. Polyethers having a low molar mass show somewhat improved dilutability with water. This becomes clear especially on comparison of Example 17 with Example 18, which differ merely in their molar mass.

In addition, binary mixtures (mass ratio 1:1) of some of the abovementioned examples were also examined with regard to their viscosity and dilutability. The results are collated in Table 4.

TABLE 4

Results of the performance testing of binary mixtures (mass ratio 1:1)

| Component 1 | Component 2 | Viscosity at 25° C. in Pa · s | Viscosity at 0° C. in Pa · s | Dilutability |
|---|---|---|---|---|
| Example 15 | — | 0.201 | 1.460 | moderately good distributability stable milky emulsion with few greasy spots |
| Example 15 | Example 12 | 0.170 | 0.744 | good distributability stable milky emulsion |
| Example 15 | Example 10 | 0.129 | 0.547 | good distributability stable milky emulsion |

TABLE 4-continued

Results of the performance testing of binary mixtures (mass ratio 1:1)

| Component 1 | Component 2 | Viscosity at 25° C. in Pa · s | Viscosity at 0° C. in Pa · s | Dilutability |
|---|---|---|---|---|
| Example 15 | Example 14 | 0.095 | 0.412 | good distributability stable milky emulsion |

Viscosity and self-emulsifiability of the carrier can thus be controlled by mixing different pols ethers A mixture of the polyether from Example 15 with one of the polyethers from Example 10, 12 or 14 shows, for example, lower viscosity and better self-emulsifiability than the polyether from Example 15 on its own.

The invention claimed is:

1. A carrier for at least one active ingredient, comprising:

a composition comprising at least one compound of Formula (I)

$$R^1O—[(C_2H_3R^2)—O]_n—H \quad \text{Formula (I)}$$

wherein $R^1$ is a monovalent aliphatic radical having 1 to 22 carbon atoms, $R^2$ is in each case independently a hydrogen radical or a methyl radical, and n is a number from 1 to 300, with the proviso that at least one $R^2$ radical is a methyl radical;

wherein the at least one active ingredient comprises at least one active microbiological ingredient;

wherein the at least one active microbiological ingredient has increased storage stability relative to without the carrier; and wherein a number-average molar mass of the at least one compound of Formula (I) is from 400 g/mol to 3000 g/mol.

2. The carrier according to claim 1, wherein the $R^1$ radical is an alkyl radical.

3. The carrier according to claim 1, wherein 10% to 100% of the $R^2$ radicals are methyl radicals.

4. The carrier according to claim 1, wherein a hydrophilic-lipophilic balance (HLB) value of the at least one compound of Formula (I) is from 0.0 to 14.0.

5. The carrier according to claim 1, wherein the at least one active ingredient further comprises at least one active chemical ingredient.

6. The carrier according to claim 1, wherein the at least one active microbiological ingredient is selected from the group consisting of *Trichoderma harzianum, Bacillus amyloliquefaciens, Beauveria bassiana, Metarhizium rileyi, Metarhizium anisopliae, Clonostachys rosea, Aureobasidium pullulans, Coniothyrium minitans*, and an organ thereof.

7. The carrier according to claim 1, wherein the at least one active microbiological ingredient comprises or consists of spores.

8. The carrier according to claim 1, wherein the at least one active microbiological ingredient comprises or consists of spores of *Trichoderma harzianum.*

9. The carrier according to claim 1, wherein the at least one active ingredient is selected from the group consisting of an acaricide (AC), a bactericide (BA), a fungicide (FU), a herbicide (HE), an insecticide (IN), a nematicide (NE), a growth regulator (PG), a plant fortifier (PS), a biostimulant, an inoculate, and a mixture thereof.

10. A method of storing at least one active ingredient, the method comprising:

storing the at least one active microbiological ingredient in the carrier according to claim 1.

11. A composition, comprising:

at least one compound of Formula (I), $$R^1O—[(C_2H_3R^2)—O]_n—H \quad \text{Formula (I)}$$

wherein $R^1$ is a monovalent aliphatic radical having 1 to 22 carbon atoms, $R^2$ is in each case independently a hydrogen radical or a methyl radical, and n is a number from 1 to 300, with the proviso that at least one $R^2$ radical is a methyl radical, and at least one active ingredient comprising at least one active microbiological ingredient;

wherein the at least one active microbiological ingredient has increased storage stability relative to the at least one active microbiological ingredient without the at least one compound of Formula (I).

12. The composition according to claim 11, wherein a proportion by mass of all compounds of Formula (I) based on a total mass of the composition is from 40% to <100%, and/or wherein a proportion by mass of all active ingredients based on the total mass of the composition is from >0% to 60%.

13. A method, comprising:

applying the composition according to claim 11 as a biostimulant to plants, seed, and/or soil, or mixing the composition according to claim 11 into food as a probiotic food supplement, or into animal feed as a probiotic animal feed additive.

14. A method, comprising:

treating plants, seed, and/or soils using the composition according to claim 11.

15. The composition according to claim 11, wherein the composition is a probiotic medicament.

16. A product composition, comprising:

the composition according to claim 11, wherein the product composition is a plant protection product, biostimulant, probiotic food supplement, probiotic animal feed additive, or probiotic medicament.

17. The carrier according to claim 2, wherein the alkyl radical is selected from the group consisting of methyl, ethyl, n-propyl, iso-propyl, n-butyl, iso-butyl, sec-butyl, tert-butyl, n-pentyl (amyl), 2-pentyl (sec-pentyl), 3-pentyl, 2-methylbutyl, 3-methylbutyl (iso-pentyl or iso-amyl), 3-methylbut-2-yl, 2-methylbut-2-yl, 2,2-dimethylpropyl (neopentyl), hexyl, octyl, decyl, dodecyl, myristyl, stearyl, 2-ethylhexyl, 2-propylheptyl, 3,5,5-trimethylhexyl, isononyl, and isotridecyl.

18. The carrier according to claim 1, wherein the at least one active microbiological ingredient is a spore, conidium, blastospore, chlamydospore, sclerotium, or hyphal segment.

19. The carrier according to claim 1, wherein $R^1$ is an alkyl radical having 1 to 4 carbon atoms, 20% to 80% of the $R^2$ radicals as methyl radicals, and/or the number-average molecular mass is from 400 to 2000 g/mol.

* * * * *